(12) United States Patent
Schoeche et al.

(10) Patent No.: US 11,740,176 B2
(45) Date of Patent: Aug. 29, 2023

(54) FAST AND ACCURATE MUELLER MATRIX INFRARED SPECTROSCOPIC ELLIPSOMETER

(71) Applicant: J.A. WOOLLAM CO., INC., Lincoln, NE (US)

(72) Inventors: Stefan Schoeche, Lincoln, NE (US); Craig M. Herzinger, Lincoln, NE (US); Steven E. Green, Lincoln, NE (US); Martin M. Liphardt, Lincoln, NE (US); James D. Welch, Omaha, NE (US)

(73) Assignee: J.A. WOOLLAM CO., INC, Lincoln, NE (US)

( * ) Notice: Subject to any disclaimer, the term of this patent is extended or adjusted under 35 U.S.C. 154(b) by 79 days.

(21) Appl. No.: 17/803,029

(22) Filed: Jan. 18, 2022

(65) Prior Publication Data

US 2023/0184671 A1    Jun. 15, 2023

Related U.S. Application Data

(60) Provisional application No. 63/288,441, filed on Dec. 10, 2021.

(51) Int. Cl.
    *G01N 21/21*    (2006.01)
(52) U.S. Cl.
    CPC ..... *G01N 21/211* (2013.01); *G01N 2021/213* (2013.01); *G01N 2201/021* (2013.01);
    (Continued)

(58) Field of Classification Search
    CPC .......... G01N 21/211; G01N 2021/213; G01N 2201/021; G01N 2201/06113; G01N 2201/12
    See application file for complete search history.

(56) References Cited

U.S. PATENT DOCUMENTS

| | | | | |
|---|---|---|---|---|
| 5,042,951 A | * | 8/1991 | Gold ................. | G03F 7/706933 356/369 |
| 8,705,032 B2 | * | 4/2014 | Herzinger ................. | G01J 4/04 356/369 |

(Continued)

FOREIGN PATENT DOCUMENTS

| | | |
|---|---|---|
| DE | 10 2016 202 971 | 8/2017 |
| DE | 102016202971 A1 * | 8/2017 |

OTHER PUBLICATIONS

Abramov et al, Quantum-Cascade Lasers in Medicine and Biology, 2019, Journal of Applied Spectroscopy, vol. 86, No. pp. 1-20. (Year: 2019).*

(Continued)

*Primary Examiner* — David P Porta
*Assistant Examiner* — Fani Polyzos Boosalis
(74) *Attorney, Agent, or Firm* — James D. Welch

(57) ABSTRACT

An ellipsometer, polarimeter and the like system operating in the infrared spectral range (0.75 μm to 1000 μm), utilizing a tunable quantum cascade laser (QCL) source in combination with dithering capability to reduce speckle and standing wave effects, dual-rotating optical elements, a single-point detector, as well as optional means of reducing the size of the probe beam at the measurement surface and optional chopper for lock-in detection.

27 Claims, 7 Drawing Sheets

(52) U.S. Cl.
CPC .............. *G01N 2201/06113* (2013.01); *G01N 2201/12* (2013.01)

(56) References Cited

U.S. PATENT DOCUMENTS

| | | | | |
|---|---|---|---|---|
| 8,736,838 | B2* | 5/2014 | Herzinger | G01J 4/04 356/364 |
| 10,267,903 | B2* | 4/2019 | Weidmann | G02B 27/48 |
| 10,775,149 | B1 | 9/2020 | Antonelli et al. | |
| 10,901,241 | B1* | 1/2021 | Antonelli | G01B 9/02002 |
| 11,162,897 | B2* | 11/2021 | Antonelli | G01B 11/24 |
| 2005/0249667 | A1* | 11/2005 | Tuszynski | A61N 7/00 424/9.3 |
| 2020/0240907 | A1* | 7/2020 | Wang | G01N 21/4788 |
| 2020/0363332 | A1* | 11/2020 | Antonelli | G01N 21/4785 |

OTHER PUBLICATIONS

Hinrichs et al, "IR laser polarimetry: Breaking Limits of FTIR polarimetry for thin film studies" 2021, Optical Fibers and Sensors for Medical Diagnostics, Treatment and Environmental Applications XXI. (Year: 2021).*

Lee et al, "Dual rotating-compensator multichannel ellipsometer: Instrument development for high-speed Mueller matrix spectroscopy of surfaces and thin films" Review of Scientific Instruments: vol. 72, No. 3, pp. 1742-1754. (Year: 2001).*

Hinrichs et al, "Hyperspectral mid-infrared ellipsometric measurements in the twinkling of an eye" SpectrocopyEurope, vol. 32, No. 2, 2020, pp. 10-14. (Year: 2020).*

Hinrichs et al, "Brillian mid-infrared ellipsometry and polarimetry of thin films: Toward laboratory applications with laser based techniques" J. Vac. Sci. Technol. B, vol. 37, No. 6, 2019 (Year: 2019).*

Furchner et al, "Fast IR laser mapping ellipsometry for the study of functional organic thin films" The Royal Society of Chemistry, (Year: 2015).*

Ebner et al, "Sub-second quantum cascae laser based infrared spectroscopic ellipsometry", Journal Optical Society of America, vol. 44, No (Year: 2019).*

Furchne et al, "Sub-second infrared broadband-laser single shot phase-amplitude polarimetry of thin films" Journal Optical Society of America, vol. 4, No. 17, Jul. 2019 (Year: 2019).*

Furchnar et al, "Ultrasensitive broadband Infrared 4x4 Mueller-matrix ellipsometry for studies of depolarizing the anisotropic thin films", Journal of Vacuum Science & Technology (Year: 2019).*

Collins et al, "Automatic rotating element ellipsometers: Calibrations, operation, and real-time applications", Rev. Science Instrument, 61, Aug. 1990 (Year: 1990).*

Antonelli et al, "Ellipsometric Critical Dimension Metrology Employing Mid-Infrared Wavelengths of High-Aspect Ratio Channel Hole Module Etch Processes", Proc. of SPIE vol. 11611, Mar. 2021 (Year: 2021).*

"Quantum—Cascade Lasers in Medicine and Biology", Abramou et al., J. of Applied spectroscopy, vol. 86 No. 1, (Mar. 2019).

"IR Laser Polarimetry: Brealting Limits of FTIR Polaimctry for Thin Film Studies", Hinrichs et al., Proc. of SPIE, Event SPIE Biol (2021).

"Ellipsome TMC Critical Dimension Metrology Employing Mid-Infrared Wave Lengths for High Aspect Ratio Channel Hole Modvie Etch Procedure", Antonell et al., Proc. of SPIE Event SPIE Advanced litrography (2021).

"Automatic Rotating Elements", psometers: Calibration Operation and Real-Time Applications, Collins, Rev. Sci. Instru, 61 (8) (Aug. 1990).

"Sub-Second Quantum Cascade Laser Based Infrared Spectrascopic Ellipsometry", Ebner et al., Optics Letters, vol. 44, No. 14 (Jul. 15, 2019).

"Hyperspectral Infrared Lasere Polarimetry for Finale Shot Phase-Amplitude Imaging of Thin Films", Furchner et al., Optics Letters, vol. 44, No. 19, (Oct. 2019).

Sub-Second Infrared Broadband Laser Single-Shot Phase Amplitude Polarimetry of Thin Films, Furchner et al., Optics Letters, vol. 44, No. 17 (Sep. 1, 2019).

"Ultrasensitive Broadband Infrared 4x4 Mueller-Matrix Elipsometer for Study of Depolarizing and Anisotrupic Thin Films", Furchner et al., J. Vac. Sci & Technology B, 38 014003 (2020).

"Fast IR Mapping Ellipsometry for Study of Functional Oranic Thin Films", Furchner et al., Analyst-Royal Society of Chemistry, Accepted Mansuri at.

"Brillant Mid-Infrared Ellipsometry and Polarmetry of Thin Films: Toward Labratory Applications with Larer Bred Techment", Furchner et al., J. of Vac. Sci. & Technology B37, 060801, (2019).

Dual Rotating—compensator Multi Channel Elliprometer: Instrument Development for High Speed Mueller—Matrix Spcct-roscopy of surfacer and Thin Films, Leectady Rev. of Sci. Inst. vol. 72 No. 3 (Mar. 2001).

\* cited by examiner

FAST AND ACCURATE MUELLER MATRIX INFRARED SPECTROSCOPIC ELLIPSOMETER

This application Claims Benefit of Provisional Application Ser. No. 63/288,441 filed Dec. 10, 2021.

TECHNICAL FIELD

The present invention relates to ellipsometer and polarimeter systems, and more particularly to an ellipsometer, polarimeter or the like system operating in the infrared spectral range (0.75 µm to 1000 µm), utilizing a tunable quantum cascade laser source operated in quasi-cw mode in combination with wavelength dithering to reduce the effects of speckle and standing waves, dual-rotating optical elements, and a single-point detector. The invention further involves methods of use in real-time monitoring and mapping of large samples.

BACKGROUND

Ellipsometry is a standard optical characterization technique to measure the thickness and optical properties of thin films by monitoring the relative polarization change of polarized light reflected from or transmitted through a sample at oblique angles of incidence and comparing experimental data with model predicted values. The relevant information about the optical properties of the sample constituents and their thickness is typically extracted from a regression analysis during which the model parameters are modified with the goal of simultaneously minimizing the square error between the experimental data and model calculated data for all measured wavelengths and angles of incidence. In general, an ellipsometer system which is applied to investigate a sample sequentially comprises:
  a) a Source of a beam of electromagnetic radiation,
  b) a Polarizer element,
  c) optionally a retarding element,
  d) additional elements, such as lenses,
  e) a sample,
  f) additional elements, such as lenses,
  g) Optionally a retarding element,
  h) An Analyzer (polarizer) element, and
  i) a detector system.

Spectroscopic ellipsometry utilizes many different wavelengths of light, either sequentially or simultaneously, to extract relevant sample information. The technique is commonly applied in the NIR-Vis-UV spectral range where a combination of different light sources such as QTH, Xe, and D2 lamps, and suitable detectors such as Si or InGaAs CCDs (parallel detection), or Si/InGaAs photodiodes or photomultiplier tubes (sequential detection), are combined to cover a wide spectral range. Wavelength selectivity is achieved by either utilizing white light and spreading the different components out over array detectors after interaction with the sample (with prisms or gratings), or selecting a narrow spectral portion by means of a monochromator before interaction with the sample and detection on a single element detector. In the latter case, the spectral bandwidth must be narrower than the width of a spectral feature of interest.

Modern ellipsometers modulate one or more optical components and extract the relevant experimental data from a Fourier transformation of the modulated raw detector signal. Instruments for the NIR-Vis-UV spectral range are commercially available and can measure a full spectrum within seconds or minutes depending on if all wavelengths are detected simultaneously or scanned sequentially. The topic is well described in several publications, two such publications are the review papers by Collins et al., titled "Automatic Rotating element ellipsometers: Calibration, Operation and Real-Time Applications" Rev. Sci. Instrum., 61 (8) (1990) [1], and "Dual rotating-compensator multi-channel ellipsometer: Instrument development for high-speed Mueller matrix spectroscopy of surfaces and thin films", Rev. Sci. Instrum., 72 (3) (2001) [2].

Mueller matrix ellipsometers determine not only the standard ellipsometric parameters $\Psi$ and $\Delta$ defined as the ratio $\bar\rho$ of the complex Fresnel reflection/transmission coefficients for p- and s-polarized light (X=r or t):

$$\bar\rho = \frac{\tilde X_p}{\tilde X_s} = \tan\Psi \cdot e^{i\Delta},$$

which are valid only for samples without cross-polarization such as optically isotropic samples. Instead, the partial or full Mueller matrix is reported which can account for the effects of cross-polarization from anisotropic or structured surfaces. The Mueller matrix describes the change of the polarization state of an incoming light beam after interaction with any optical element or sample, where the polarization state is given by the Stokes vector S, as defined by $$S = \begin{bmatrix} S_0 \\ S_1 \\ S_2 \\ S_3 \end{bmatrix} = \begin{bmatrix} I_x + I_y \\ I_x - I_y \\ I_{+45°} - I_{-45°} \\ I_R - I_L \end{bmatrix}$$

Here, $I_x$, $I_y$, $I_{+45}$, $I_{-45}$, $I_R$, and $I_L$ are the measured intensities for horizontal, vertical, +45, −45°, right-circular, and left-circular polarization, respectively.

The polarization state of the reflected or transmitted light beam is then given by:

$$S_{out} = \begin{pmatrix} S_0 \\ S_1 \\ S_2 \\ S_3 \end{pmatrix}_{out} = \begin{bmatrix} M_{11} & M_{12} & M_{13} & M_{14} \\ M_{21} & M_{22} & M_{23} & M_{24} \\ M_{31} & M_{32} & M_{33} & M_{34} \\ M_{41} & M_{42} & M_{43} & M_{44} \end{bmatrix} \cdot \begin{pmatrix} S_0 \\ S_1 \\ S_2 \\ S_3 \end{pmatrix}_{in} = M \cdot S_{in},$$

where M is the unnormalized Mueller matrix. In order to extract, the full Mueller matrix, the ellipsometer needs to be able to create right and left circular (or elliptical) polarized light on the input side and detect right and left circular (or elliptical) polarized light on the detector side which requires the presence of retarding optical elements on both side of the sample. Absence of one or both retarding elements prevents measurement of the last row (no retarder on the detector side) or last column (no retarder on the input side).

The continuous rotation of one or more optical elements creates a modulated detector signal where the number of harmonics depends on the system type and number of rotating optical elements. A basic rotating analyzer ellipsometer without retarding elements has only one frequency component with a sin and cos term (two independent quantities), a single rotating compensator ellipsometer has two frequency components (4 independent quantities), while a dual rotating compensator ellipsometer has 12 frequency components (24 independent quantities). Thus, for one configuration of fixed optical elements in the beam, only the dual-rotation setup contains enough information in the raw detector signal for a full optical cycle to determine the 15 independent elements of a full normalized Mueller matrix, (i.e. the dual rotating element setup can determine either the isotropic ellipsometric parameters or the Mueller matrix from the same raw detector signal depending on sample requirements (an optical cycle for a rotating element ellipsometer is usually the time required until all moving optical elements are back to the same original position as at the beginning of the cycle)). In fact, there is redundant information in the raw data which might improve the accuracy of the ellipsometer. The single-rotating element ellipsometers can create more independent information by repositioning some of the fixed optical elements but require accordingly more optical cycles and the time to reposition the elements which increases the minimum possible measurement time. Ellipsometer systems with two rotating polarizers are unable to determine the isotropic phase parameter Δ accurately for values around 0° or 180°, (i.e. when measuring isotropic transparent samples). For existing single-rotating Analyzer systems, a fixed compensator is added to the beam after the Polarizer to add a predefined, fixed amount of retardation, (i.e. producing elliptical polarization, which significantly improves the accuracy of the determined Δ values). Similar principle might be applicable to a dual-rotating polarizer system as well but was not reported so far.

A continuously-rotating-element ellipsometer exposes the sample to many different polarization states, detects many different polarization states, or both, thereby not relying on sensitivity of the measurement to only a few predefined, potentially unfavorable input and output polarization state combinations a specific sample is exposed to. The Fourier analysis of the modulated detector signal adds another level of noise filtering. The sample information is contained in the relative amplitude of the different Fourier components, not in absolute intensity information. Further, the change of the expected frequency components or appearance of undesirable frequency components due to non-idealities of the optical or electronic setup allows identification and correction of these non-idealities by calibration and allows identification of drift away from calibration-determined system parameters.

In many ellipsometer systems, a chopper is added to the system to facilitate lock-in detection. This chopper can either be a physical device such as a rotating slotted blade added between the source and the first polarizing element or electronic means of turning on and off the light source at defined frequency. For IR detectors without DC sensitivity like many of the common IR detectors, the chopper can be essential to access this information by shifting it to an arbitrarily selectable carrier frequency. For modulated signals as present in rotating element ellipsometers, the frequency content is obtained as side bands of the carrier frequency which is commonly much higher than the modulation frequencies components (without chopper). Use of lock-in detection enables additional noise filter options. Further, optical detectors typically have higher sensitivity at increased frequency due to reduction in 1/f noise. Any system with a chopper added can only be operated in continuous or quasi-continuous wave mode.

A step-scan system typically identifies the minimum number of optical element orientation combinations necessary to theoretically overdetermine the equation system that needs to be solved to extract the desired ellipsometric quantities, (i.e. the standard ellipsometric parameters or Mueller matrix elements). Typically, ratios of intensity values are acquired to account for normalization requirements of the raw detector signal. The step-scan approach assumes that the system is stable and repeatable over time with regards to optical element positioning, temperature, light source intensity and so on.

Snapshot ellipsometers either divide the measurement beam laterally into sub-beams ("division of wave front") or utilize beam splitters ("division of amplitude"). Both setups rely on stability and repeatability of the optical beam path (including sample alignment), and their sensitivity depends on the optical arrangement which usually cannot be changed. Calibration of non-idealities in the system and evaluation of calibration drifts over time is much harder due to the absence of a modulated detector signal.

Commercial ellipsometers for the infrared (IR) spectral range utilize the FTIR principle where the information for all wavelengths is extracted simultaneously from an interferogram created by an interferometer light source, (e.g. facilitating a globar source in combination with a Michelson interferometer, and detected with a single-point detector which prevents continuous modulation of the optical elements and slows down the measurement process significantly). Instead, a full optical cycle for each wavelength is created sequentially by stepping the "rotating" optical element through equally spaced orientations and obtaining a full spectrum for each orientation before moving on to the next one. The minimum required number of discrete steps depends on the number of harmonics created with the specific ellipsometer type, (e.g. 4 harmonics for a single rotating compensator ellipsometer require at least 9 discrete compensator orientations to resolve these 4 frequency components according to Nyquist theorem). Dual-rotating compensator systems to measure the full Mueller matrix accordingly would require at least 49 orientations which would not be feasible in practice. Spectrometers based on the FTIR principle report spectra of fixed wavelength spacing where the resolution depends on the maximum path difference in the two arms of the interferometer. Narrow spectral features, even if only present in a limited part of the spectrum, require finer resolution measurements which increases measurement time inversely proportional to improvement in resolution. Further, the thermal light sources utilized in the interferometer source emit low light intensity and have large divergence resulting in long averaging times and preventing focusing of the light beam to a small measurement spot, thereby limiting sample throughput, preventing mapping or real-time measurements for process monitoring, and limiting the minimum size of samples that can be studied. Typical measurements of advanced data types such as Generalized ellipsometry or Mueller matrix which often also require the measurement at multiple sample azimuths can take several days per sample even on a single-rotating compensator ellipsometer.

Continuing, recently tunable, monochromatic quantum cascade lasers (QCL) for the IR spectral range became commercially available. These high-intensity, coherent light sources are widely tunable with spectral bandwidth <1 cm$^{-1}$ and enable the application of similar design principles as used recently for the NIR-Vis-UV spectral including continuous rotation of optical elements, focusing, and fast sequential detection of a multitude of relevant wavelengths. Only these narrow bandwidth, tunable sources allow measurements at a pre-selectable set of wavelengths which can be uniquely tailored to the characteristic absorption features of a sample of interest. QCL's are typically operated in a pulsed mode with repetition frequencies in the MHz range. Optical systems utilizing these QCL sources can either detect individual pulses assuming stable pulse-to-pulse intensity and fast enough detectors are used, or they can be operated in quasi-continuous wave mode where many pulses are averaged per detected data point. The divergence of the QCL beam is typically better than 5 mrad which allows focusing of the collimated beam to diffraction limited spot sizes of less than 200 µm by means of IR transparent lenses, for example made of low-dispersion ZnSe, or by reflective focusing optics made of non-planar mirrors. The monochromatic nature of the QCL further allows use of adjustable focusing optics, which optimize the position of the optic for a given frequency in order to account for focus shifts as a consequence of chromatic aberration in the lens system. This allows diffraction limited focusing of the beam for a wide range of frequencies. Although not related to Patentability of the present invention, it is note that one relevant patent in this area is U.S. Pat. No. 8,351,036 to Liphardt.

A unique characteristic of a QCL source, often explored in other applications but detrimental here, is the very long coherence of the emitted light compared to conventional thermal light sources. For the purpose of ellipsometry measurements, a long coherence length is unfavorable for several reasons. Coherent reflections from the backside of a thick substrate cause interference oscillations in the data, (i.e. oscillations in $\Psi$ and $\Delta$ versus frequency (i.e. energy units) caused by constructive and destructive interference of light reflected from the sample surface and backside)). The relatively large thickness of typical substrates relative to the wavelength of the probing light leads to spectrally very narrow spacing of the interference pattern and slightest substrate thickness non-uniformity causes an envelope of the interference maxima and minima that is very hard to model as exact optical constants and thickness values are required to match the characteristic pattern. On the other hand, totally incoherent light reflections from the backside and front of the substrate hitting the detector only lead to slight shifts in $\Psi$ and $\Delta$, and algorithms exist to easily account for this type of incoherent backside reflection in the data. Existing patents using QCL sources deal with this problem, for example, by implementing a knife edges to suppress the backside reflections as disclosed in U.S. Pat. No. 10,901,241. Another very significant aspect of the long coherence length is the formation of speckle and standing wave patterns which strongly and randomly influence the data versus frequency. Speckle is the result of scattering on rough surfaces like a sample or the surface of an optical element in the beam path caused by very small path length differences and interference of different parts of the initially collimated beam on the detector. The speckle pattern is very sensitive to variations in the optical beam path such as structural modification as a result of pressure applied to a photo-elastic modulator, mechanical rotation of an optical element, or mechanical shifts of optical element positions as a result of an angle-of-incidence change, for example. Standing wave patterns arise from certain reflections within the optical system which can occur between any interfaces that the beam crosses at normal incidence, in the entire beam path from the source to the detector, and with potential distances between the reflecting surfaces only limited by the coherence length of the light source. The formation of Standing Waves is, in principle, similar to the creation of speckle, but while for speckle many sub-beams of the same wave front interfere to cause a spatial variation of intensity on the detector, for standing waves, different wave trains reflected and transmitted at different parallel interfaces cause an interference patterns with respect to different wavelength. In fact, the presence of such standing waves can only be seen when measuring many narrowly spaced frequencies. It is very hard to identify the source of these patterns as path differences can be a single wavelength, for example within a wire grid polarizer or it could be many multiples of the wavelength, for example an interference between the detector window and the first polarizer. These patterns show up in the data at unpredictable spectral positions and are impossible to account for by calibration. Even if identified, elimination of the sources is often impossible. One potential way of elimination disclosed here is a fast, longitudinal repositioning of one the causing optical interfaces around its center position, (i.e. movement along the beam path, but the mechanical movement would need to be faster than the averaging time of the detector). A primary concern in most ellipsometry applications patents is maximization of speed of operation. Effective reduction of the coherence length for individually measured pulses of the QCL is not easily possible and the respective systems must suffer from accuracy issues in one form or another either due to speckle or standing waves. This is a non-trivial problem and effective mitigation strategies are needed to overcome these issues. Here, we emphasize that the present invention, instead of dealing with the coherence, seeks to circumvent the resulting problems by shortening the coherence using electronic, mechanical, or optical measures, averaging of many pulses by use of relatively slow detectors or pulse train integration on faster detectors, and by using large area single point detectors that collect most of the speckle pattern. The disclosed systems are therefore entirely different in nature from previously disclosed QCL-based ellipsometer systems as well as traditional spectroscopic ellipsometer systems, which do not use a coherent light source.

Reduction of the coherence length of a highly coherent light source such as a QCL is a non-trivial problem. Different methods for monochromatic light were developed for example to mitigate speckle effect in laser-based projectors. Common mechanical and/or optical approaches include the use of rough spinning discs, vibrating transparent membranes, the use of long multimode fibers (sometimes in combination with stretching or vibration), polarization scrambling in anisotropic optics and perhaps others. All these approaches can be applied in combination with QCL light sources in the ellipsometer designs proposed here. However, in a preferred embodiment, a different approach, based on wavelength scrambling is preferred. That is, the approach if averaging many pulses of slightly different wavelengths around a central measurement wavelength. In commercially available QCL systems, the wavelength can be set very quickly using external trigger modes which essentially apply small steps to the motors that control the position of the grating in the external grating cavity that selects the lasing wavelengths. By "dithering" the grating around the set wavelength position, for example periodically or randomly adding and subtracting small angle shifts from the set position, slightly different wavelengths can be set in very quick succession. Using pulse averaging on the detector, the perceived bandwidth of the laser line is effectively broadened. Since coherence length and broadening of a laser line are inversely proportional to each other, this is equivalent to a reduction of the coherence length. Consequently, this approach is only applicable when many pulses are averaged on the detector, in stark contrast to existing patents. The wavelength dithering approach can be applied in combination with common alternative speckle reduction schemes.

The light emitted from a QCL is linearly polarized. In certain situations it might be desirable to rotate the polarization state to optimize light throughput through the ellipsometer, for example utilizing an "odd-bounce" system as described in a patent to Herzinger at al. (U.S. Pat. No. 6,795,184).

The accuracy of the ellipsometer system for a wide range of samples relies heavily on the achievable retardation of the retarding optical elements and extinction ratio of the polarizing elements. Retarder designs based on birefringence of the retarder material are not suitable for the IR spectral range since no natural materials with large enough birefringence are known. However, common designs based on total internal reflection are applicable. Custom shapes of prisms are commercially available, for example made of ZnSe which is transparent between 0.45 and 21 µm. Wire grid polarizers, either free-standing or on a suitable, transparent substrate, are commercially available for the infrared spectral range.

While generally allowing for faster data acquisition, the use of Photo-Elastic Modulators (PEM's) as retarding devices in a standard or Mueller matrix ellipsometer is generally considered less desirable due to temperature sensitivity, calibration drift over time, memory effects, and other non-idealities. Further, the underlying math to describe the entire system, specifically in the presence of non-idealities, is much more complicated than for a rotating-optical element system. Existing patents specify an adjustable retardance for each wavelength to keep the retardance value at optimized values of 90° which simplify the math considerably. Note, that retardance values for compensators, based on total internal reflections are designed to optimal values for dual-rotation systems which are different from 900, vary slightly with wavelength due to dispersion, and are fixed after assembly of the optic. The signal-to-noise ratio of the measured data in any ellipsometer system is generally believed to depend on the total number of photons collected per optical cycle and averaging of several hundred modulation cycles is typically required for PEM systems to achieve satisfactory SNR levels negating some if not all of the speed advantage over a system with mechanically modulated optical elements and much higher photon count per single optical cycle. A PEM-based ellipsometer with only one PEM in the beam path only reports two normalized frequency components which is insufficient to determine even the full sample information of an isotropic sample (Standard ellipsometry parameters V and A over the full range from 0-360°). More data content can be created by mechanically moving other optical elements in the beam path and remeasuring the same sample or adding more PEM units in the beam path. To measure a full Mueller matrix, a total of four PEM must be included in the system, all operated at finely synchronized unique frequencies. The resulting math requires expansion in terms or Bessel functions and becomes even more complicated in the presence of non-idealities. Therefore, all PEM-based QCL systems reported in the literature or as patent only are equipped with a single PEM unit which is not sufficient to measure the full Mueller matrix. All these systems are mainly applicable for isotropic samples without cross-polarization which significantly limits their usefulness for many modern applications in semiconductor metrology, metamaterials, and other current fields of interest. The present invention could, but does not utilize PEM's.

A Search for relevant prior art has provided the following patents and peer-reviewed publications:

U.S. Pat. No. 5,042,951 discloses a laser based ellipsometer operated with a HeNe laser at 633 nm.

Furchner et al. reported on mapping of organic films using a HeNe laser based single wavelength IR laser ellipsometer operated in the rotating-analyzer mode in a publication titled "Fast IR Laser Mapping Ellipsometry for the Study of Functional Organic Thin Films", Analyst, 140, 1791-1797(2015).

Patent DE 10 2016 202 971 A1 discloses a snapshot ellipsometer for the infrared spectral range having a high-brilliance monochromatic light source operated in a single-shot mode where the probing beam is split into multiple sub-beams after interaction with the sample and detected by multiple polarization state detectors or different polarization filtering properties. Fast single-point detectors are required to resolve individual shots. The ellipsometric parameters are extracted by simultaneous consideration of the multiple detector signals for each shot of the light source.

In two related publications by the same authors titled "Hyperspectral Infrared Laser Polarimetry for Single-Shot Phase-Amplitude Imaging of Thin Films", Opt. Lett., Vol. 44, No 19 (2019), and "Sub-Second Infrared Broadband-Laser Single Shot Phase-Amplitude Polarimetry of Thin Films", Opt. Lett., Vol. 44, No. 17 (2019), Furchner et al. demonstrated time-resolved measurements and mapping of biologic samples in a standard ellipsometry mode using the snapshot ellipsometer.

The publication "Ultrasensitive Broadband Infrared 4×4 Mueller-Matrix Ellipsometry for studies of depolarizing and anisotropic thin films" published by Furchner et al. in J. Vac. Sci. Technol. B 38, 014003 (2020) reveals a broadband 4×4 Mueller matrix ellipsometer with retractable achromatic retarders and various sets of tandem polarizers utilizing an FTIR source with a globar. Measurements are performed using a step-scan principle with only a few selected polarizer and compensator positions measured and combined to extract the Mueller matrix of the sample.

US patents and Publications, U.S. Pat. No. 10,775,149 B1, US 2020/0363332 A1. U.S. Pat. No. 10,901,241 and 11,162,897 disclose a small measurement spot metrology device for at least partially transparent multilayer structure characterization based on an ellipsometer with tunable QCL source and at least one photoelastic modulator as retarding device, adjusted to produce the same amount of retardation for each wavelength. The patents further outline means for failure mode detection of the QCL, backside reflection suppression utilizing a knife edge, and spatial filtering to reduce the effective numerical aperture seen by the detector.

Ebner et al. reported a QCL based ellipsometer in "Sub-Second Quantum Cascade Laser Based Infrared Spectroscopic Ellipsometry", Opt. Lett., Vol. 44, No 15 (2019). Their system uses a single-phase modulator on the input side to measure the standard ellipsometric parameters Ψ and Δ.

Patent US 2020/0240907 A1 discloses a metrology device based on the FTIR principle and, though practically not reasonable, in one embodiment illumination is provided by one or more QCL sources.

A paper by Lee et al. titled "Dual Rotating-Compensator Multichannel Ellipsometer: Instrument Development for High-Speed Mueller Matrix Spectroscopy of Surfaces and Thin Films" published in Rev. Sci. Instrum., Vol. 72 No. 3 (2001) outlines the principle and calibration routines of a dual-rotating compensator ellipsometer in the NIR-Vis-UV spectral range with parallel CCD detection.

U.S. Pat. Nos. 8,736,838 and 8,705,032 disclose in their preferred embodiment, a THz ellipsometer system which employs the dual-rotation of optical elements in combination with a frequency-tunable coherent backwards-wave oscillator source and a Golay cell detector.

While not critical to Patentability, it is noted that U.S. Pat. No. 6,084,675 describes an adjustable beam alignment compensator/retarder with application to spectroscopic ellipsometry. Also, U.S. Pat. No. 6,141,102 describes a single triangular shaped optical retarder element. U.S. Pat. No. 5,946,098 describes a dual tipped wire grid polarizer in combination with multiple retarders. U.S. Pat. No. 6,084,674 describes a dual horizontally oriented triangular shaped optical retarder. U.S. Pat. No. 6,084,674 describes a parallelogram shaped optical retarder element. U.S. Pat. Nos. 7,450,231 and 7,460,230 describe deviation angle self-compensating retarder systems.

The present invention deviates from the prior art in that it combines highly tunable, brilliant QCL laser sources operated in quasi-cw mode with a coherence length reduction scheme, the dual-mechanical rotation of optical elements in the beam path, and use of averaging single-point detectors. The invention also utilizes the dual-continuous rotation with sequential scanning of the wavelength in order to extract a modulated detector signal that can be used to accurately calibrate the ellipsometer and extract the most accurate data from a sample. Coherence length scrambling circumvents critical issues that limit data accuracy such as standing wave patterns and speckle. The system can determine advanced data types such as Generalized ellipsometry and Mueller matrix for anisotropic or scattering samples. Mueller matrix or Generalized ellipsometry data can be determined from the same single optical cycle data as the standard ellipsometric parameters $\Psi$ and $\Delta$ which presents a significant speed advantage over a single-rotating element system. A prototype has been built to demonstrate these unique capabilities not reported so far in any other patent or reported in the literature. Some exemplary data is included in the accompanying Detailed Description and Drawings section.

While the forging disclosure shows that it is known to apply Quantum Cascade Lasers as Source of Electromagnetic Radiation in Ellipsometers and the like, it is emphasized that it has not been known to apply Speckle and Standing Wave Reducing Means thereto. A Search at the USPTO Website for patent including (Quantum and (Cascade and (Laser and (Speckle and (Ellipsometer))))) turned up no hits. A similar Search was conducted for Published applications and returned only one hit. That is US2005/0249667. Said Published application, however, does not disclose anything remotely like the invention presented herein. A patent which discusses QCL's and dithering, U.S. Pat. No. 10,267,903 is mentioned as it is known. Further. USPTO Data Base Searching for patents by known manufacturers (patent Assignees), for Quantum Cascade Lasers, (e.g. Daylight and Block Engineering) fails to show that use thereof in ellipsometers and polarimeters was considered. While Daylight does consider Speckle in some of its patents, that is not in conjunction with use in ellipsometry or polarimetry.

Even in view of the prior art, need remains for ellipsometers, polarimeters and the like systems which operate in the infrared spectral range (0.75 µm to 1000 µm), which ellipsometers and polarimeters utilize a tunable quantum cascade laser source, wherein speckle and standing waves are reduced via coherence length control achieved by dithering, in combination with dual-rotating optical elements, a single-point detector, and that can include optional means of reducing the size of the probe beam at the measurement surface and use of a chopper to synchronize the detector signal.

DISCLOSURE OF THE INVENTION

In broad terms, the present invention is a mid-infrared ellipsometer or polarimeter system with a high-brilliance, low-divergence, tunable light source in combination with a single-point detector utilizing the dual-optical element rotation principle and operated in quasi-cw mode, including Speckle and Standing Wave effects mitigation via coherence wavelength dithering.

The present invention is, in its preferred embodiment, a method of investigating a sample which reduces the effects of speckle and standing waves, comprising the steps of:

a) providing an ellipsometer or polarimeter system comprising:
  a') a quantum cascade laser source of high-brilliance, tunable electromagnetic radiation with emission wavelengths in the mid-infrared spectral range, said quantum cascade laser source comprising means for dithering the electromagnetic radiation output;
  b') a beam polarizing optical element;
  c') a first rotatable optical retarder or polarizer element;
  d') a stage for supporting a sample;
  e') a second rotatable optical retarder or polarizer element;
  f') a beam analyzing polarizer optical element;
  g') a single-point detector for infrared radiation which is not capable of resolving individual pulses of quantum cascade laser electromagnetic radiation.

Said ellipsometer or polarimeter system is characterized in that:
  during use said quantum cascade laser source of electromagnetic radiation operates in a continuous or quasi-continuous wave mode, (i.e. pulses are not detected individually); and
  during use the wavelength content of said continuous or quasi-continuous wave is dithered so that cyclically or randomly a sequential plurality of different wavelengths around a central wavelength is output; and
  during use said detector provides output data based on an average of a multiplicity of pulses in said continuous or quasi-continuous dithered electromagnetic radiation input thereto; and
  during use said rotatable optical retarder or polarizing elements continuously rotate at different frequencies of fixed ratio.

Said Method continues with:
  b) placing a sample on said stage for supporting a sample;
  c) while causing said rotatable optical retarder or polarizing elements continuously rotate at different frequencies of fixed ratio, causing said quantum cascade laser source to provide a dithered continuous or quasi-continuous beam of electromagnetic radiation directed so that it passes through said:
    beam polarizing optical element; and
    first rotatable optical retarder or polarizer element;
    interacts with said sample on said stage for supporting a sample;
  then passes through said:
    second rotatable optical retarder or polarizer element; and
    beam analyzing polarizer optical element; and
    enters said single-point detector for infrared radiation;
  d) causing said single-point detector for infrared radiation to provide sample characterizing output data based upon said received dithered continuous or quasi-continuous beam of electromagnetic radiation; and e) analyzing the data output by said single-point detector to provide sample characterizing information.

The step of providing ellipsometer or polarimeter system can involve providing a system characterized by at least one selection from the group consisting of:

a") said detector is characterized by a selection from the group consisting of:
DTGS;
MCT;
LiTaO3;
PbS;
PbSe;
InSb;
a QWIP detector; and
a Si bolometer;

b") said beam polarizing and analyzing optical elements are free-standing or substrate-bonded wire grid polarizers;

c") said first and second retarding or polarizer optical elements are dual Fresnel rhomb retarders, a single-triangle retarder, a dual-triangular shaped retarder, or a parallelogram-shaped retarder;

d") said beam polarizing and analyzing optical elements are movable along the path of the beam of electromagnetic radiation;

e") said first rotatable retarder or polarizer optical element is a rotatable polarizer optical element;

f") said second rotatable retarder or polarizer optical element is a rotatable polarizing optical element;

g") said first rotatable retarder or polarizer optical element is a rotatable retarder optical element;

h") said second rotatable optical retarder or polarizer element is a rotatable retarder optical element;

i") a polarization state rotator is placed between the source and the beam polarizing element;

j") an additional movable polarizer is provided in front of the beam polarizing element; and k") where lenses are added between the rotatable optical retarder or polarizing elements and the sample to reduce the size or the measurement spot on the sample surface.

Said method can involve, in step e), performing a regression based on data obtained in step e) onto a mathematical model of the sample.

Said method can further involve changing the relative distance, along the path of the beam of electromagnetic radiation, between at least two system elements selected from the group consisting of:

a') said quantum cascade laser source of high-brilliance, tunable electromagnetic radiation with emission wavelengths in the mid-infrared spectral range, said quantum cascade laser source comprising means for dithering the electromagnetic radiation output;

b') said beam polarizing optical element;

c') said first rotatable optical retarder or polarizer element;

d') said stage for supporting a sample;

e') a second rotatable optical retarder or polarizer element;

f') said beam analyzing polarizer optical element; and g') said single-point detector for infrared radiation which is not capable of resolving individual pulses of quantum cascade laser electromagnetic radiation;

and obtaining data sets for each resulting configuration, then performing a simultaneous regression of all said data sets onto a mathematical model of said sample.

This simultaneous regression approach can be especially beneficially applied when the changed distance involved is between:

f') said beam analyzing polarizer optical element; and g') said single-point detector for infrared radiation which is not capable of resolving individual wavelengths of quantum cascade laser electromagnetic radiation;

and Standing Waves present a problem that is nearly impossible to account for in a mathematical model. The simultaneous regression onto multiple data sets can serve to average out, or even cancel the effects of Standing Waves between said f') and g') elements. If the position of said system elements can be changed much faster than the averaging time of the detector, averaging out of the effect might occur in a single data set without the need for simultaneous regression.

At this point, to aid with understanding the benefit of the simultaneous regression approach using multiple data sets, it should be appreciated that coherence length in a beam or electromagnetic radiation is the source of speckle and standing wave problems in sample investigation. That is, both speckle and standing waves have their source in coherence length. Interference at the detector occurs if all of the back and forth reflected beams in the entire system can interfere. This is based on the same principle as the speckle effects, but for the speckle, a lot of parallel parts of the beam that interfere. For the standing waves, different wave trains reflected between parallel interfaces interfere. The difficulty as regards standing waves is that since the length difference is long, it is very hard to identify which interfaces cause the effect. The path difference can be a single wavelength, e.g. within a wire grid polarizer or it could be many multiples of the wavelength, e.g. an interference between the detector window and the first polarizer. Shortening of the coherence length avoids these standing waves as well as speckle.

Continuing, the present invention can also be described as an ellipsometer or polarimeter system sequentially comprising:

a) a high-brilliance, tunable quantum cascade laser source or electromagnetic radiation with emission wavelengths in the mid-infrared spectral range;

b) a beam polarizing optical element;

c) a first rotatable optical retarder or polarizer element;

d) a stage for supporting a sample;

e) a second rotatable optical retarder or polarizer element;

f) a beam analyzing polarizing optical element;

g) a single-point detector of infrared radiation.

Said ellipsometer is characterized by:

said rotatable optical retarder or polarizer elements continuously rotate at different frequencies of fixed ratio;

said tunable quantum cascade laser source of electromagnetic radiation operates in a continuous or quasi-continuous wave mode and does not resolve individual laser pulses, but rather averages a multiplicity thereof when obtaining data; and said ellipsometer system further comprises a grating which is periodically or randomly changed in position to add and subtract small angle shifts from a nominal wavelength set position, thereby providing slightly different wavelengths at different times which reduces coherence length and thereby reduce speckle.

(It is noted that the grating is typically present in a quantum cascade laser system per se., which is an integral part of the ellipsometer or polarimeter system).

An alternative recitation of a method of investigating a sample comprises the steps or:

a) providing an ellipsometer or polarimeter system comprising:
- a') a high-brilliance, tunable quantum cascade laser source of electromagnetic radiation with emission wavelengths in the mid-infrared spectral range including dithering capability;
- b') a beam polarizing optical element;
- c') a first rotatable optical retarder or polarizer element;
- d') a stage for supporting a sample;
- e') a second rotatable optical retarder or polarizer element;
- f') a beam analyzing polarizer optical element;
- g') a single-point detector of infrared radiation;

said ellipsometer or polarimeter being characterized by:
- said rotatable optical retarder or polarizing elements continuously rotate at different frequencies of fixed ratio; and
- said quantum cascade laser source of electromagnetic radiation operates in a continuous or quasi-continuous wave mode and does not resolve individual laser pulses, but rather averages a multiplicity thereof when obtaining data;

b) applying said ellipsometer system to investigate a sample system with characteristic, sharp, spectral features in narrow ranges of the IR spectral range by customizing the measurement resolution spectrally to be able to fully resolve the features while limiting the number of data points in "flat" spectral areas.

Another recitation or a present invention method for investigating a sample comprises the steps of:
a) providing an ellipsometer system comprising:
- a') a high-brilliance, tunable quantum cascade laser source of electromagnetic radiation with emission wavelengths in the mid-infrared spectral range;
- b') a beam polarizing optical element;
- c') a first rotatable optical retarder or polarizer element;
- d') a stage for supporting a sample;
- e') a second rotatable optical retarder or polarizer element;
- f') a beam analyzing polarizer optical element;
- g') a single-point detector for infrared radiation.

Said ellipsometer or polarimeter is characterized by:
- said rotatable optical retarder or polarizing elements continuously rotate at different frequencies of fixed ratio;
- said source of electromagnetic radiation operates in a continuous or quasi-continuous wave mode and does not resolve individual laser pulses, but rather averages a multiplicity thereof when obtaining data;
- said ellipsometer system further comprises a grating which is periodically or randomly changed in position to add and subtract small angle shifts from a nominal wavelength set position, thereby providing slightly different wavelengths at different times which reduces coherence length and thereby reduce speckle and standing waves;
- said stage for supporting a sample being within a chamber with IR transparent windows that allow the electromagnetic radiation to pass through the windows at normal incidence.

Said method continues with:
b) placing a sample on said sample stage and causing a beam of electromagnetic radiation produced by said high-brilliance, tunable source of a beam of electromagnetic radiation with emission wavelengths in the mid-infrared spectral range to pass through said IR transparent windows and interact with the sample mounted on said stage for supporting a sample;
c) setting the wavelength output emitted from the source of electromagnetic radiation to one wavelength, or a discrete, small, pre-defined subset of wavelengths suitable to characterize modification of said sample within said chamber and repeatedly cycling through said subset of wavelengths to monitor the change of sample properties versus time.

Another present invention method of investigating a sample comprises the steps of:
a) providing an ellipsometer or polarimeter system comprising:
- a') a high-brilliance, tunable quantum cascade laser source of electromagnetic radiation with emission wavelengths in the mid-infrared spectral range;
- b') a beam polarizing optical element;
- c') a first rotatable optical retarder or polarizer element;
- d') a stage for supporting a sample;
- e') a second rotatable optical retarder or polarizer element;
- f') a beam analyzing polarizer optical element;
- g') a single-point detector of infrared radiation;

said ellipsometer or polarimeter being characterized by:
- said rotatable optical retarder or polarizing elements continuously rotate at different frequencies of fixed ratio;
- said quantum cascade laser source of electromagnetic radiation operates in a continuous or quasi-continuous wave mode and does not resolve individual laser pulses, but rather averages a multiplicity thereof when obtaining data; and
- said ellipsometer system further comprises a grating which is periodically or randomly changed in position to add and subtract small angle shifts from a nominal wavelength set position, thereby providing slightly different wavelengths at different times which reduces coherence length and thereby reduce speckle; b) placing a sample on said sample stage and causing a beam or electromagnetic radiation produced by said high-brilliance, tunable source of a beam of electromagnetic radiation with emission wavelengths in the mid-infrared spectral range to interact with the sample mounted on said stage for supporting a sample and enter said single point detector;
c) setting the wavelength output emitted from the source of electromagnetic radiation to one wavelength, or a discrete, small, pre-defined subset of wavelengths suitable to characterize the variation of the sample properties, and while moving the sample under the measurement beam observing data provided by said single point detector output.

It is noted that as in the case of the first recited Method herein, in any of the foregoing ellipsometer or polarimeter systems or methods of use, the ellipsometer can be characterized by at least one selection from the group consisting of:
- DTGS;
- MCT;
- LiTaO3;
- PbS;
- PbSe;
- InSb;
- a QWIP detector; and
- a Si bolometer;
- b") said beam polarizing and analyzing optical elements are free-standing or substrate-bonded wire grid polarizers;
- c") said first and second retarding or polarizer optical elements are dual Fresnel rhomb retarders, a single-triangle retarder, a dual-triangular shaped retarder, or a parallelogram-shaped retarder;

d") said beam polarizing and analyzing optical elements are movable along the path of the beam of electromagnetic radiation;

e") said first rotatable retarder or polarizer optical element is a rotatable polarizer optical element;

f") said second rotatable retarder or polarizer optical element is a rotatable polarizing optical element;

g") said first rotatable retarder or polarizer optical element is a rotatable retarder optical element;

h") said second rotatable optical retarder or polarizer element is a rotatable retarder optical element;

i") a polarization state rotator is placed between the source and the beam polarizing element;

j") an additional movable polarizer is provided in front of the beam polarizing element; and k") where lenses are added between the rotatable optical retarder or polarizing elements and the sample to reduce the size or the measurement spot on the sample surface.

Further, in any of the foregoing providing an ellipsometer system can further comprise at least one selection from the group consisting of:

a chopper between source and beam polarizing optical element and electronic means to synchronize the detector signal to the chopper frequency lock-in detection;

a stationary retarder after the first rotatable element to present elliptically polarized electromagnetic radiation thereafter;

a speckle reducer between said quantum cascade laser source of infrared electromagnetic radiation and said single point detector thereof;

a fixed compensator between said quantum cascade laser source of infrared electromagnetic radiation and said single point detector thereof;

focusing and re-collimation elements before and after said stage for and supporting a sample respectively;

focusing and re-collimation lenses which are mounted to allow movement along the path of said beam of electromagnetic radiation before and after said stage for and supporting a sample respectively; and selecting said first and second rotatable optical retarder or polarizer elements from the group consisting of:
  the first is a retarder optical element and the second is a polarizer optical element;
  the second is a retarder optical element and the first is a polarizer optical element;
  both first and second optical elements are polarizer elements;
  both first and second optical elements are retarder elements.

The present invention will be better understood by reference to the Detailed Description Section of this Specification in conjunction with the Drawings.

DETAILED DESCRIPTION

Figure 1:
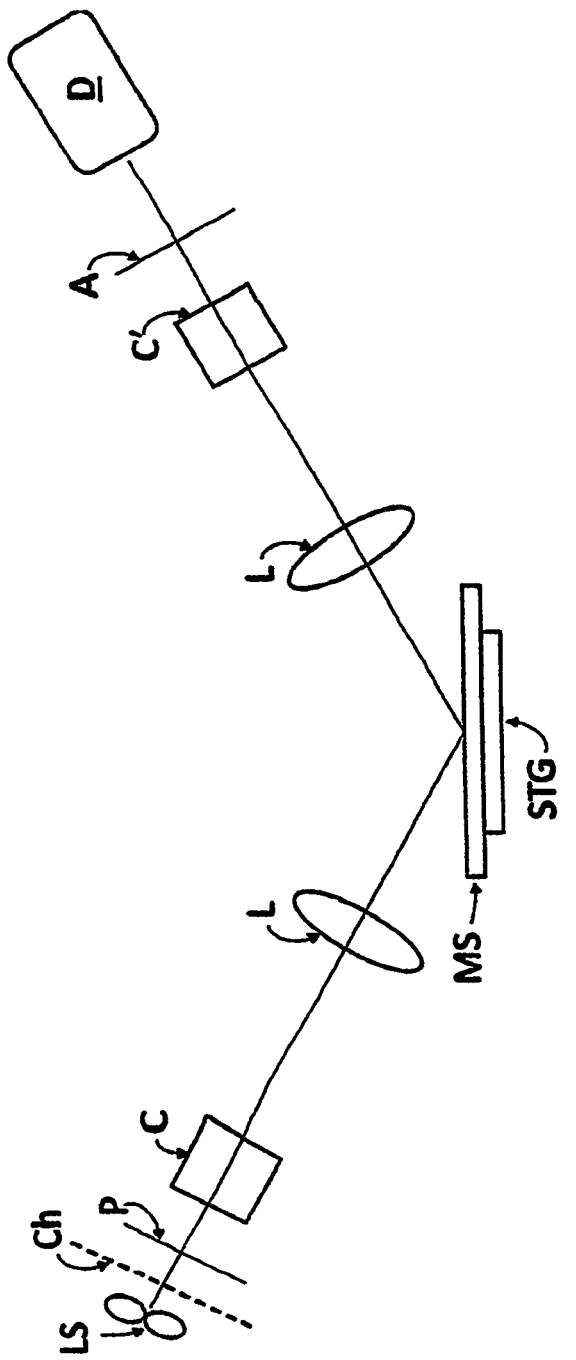
FIG. 1 depicts a general embodiment of an ellipsometer with two retarding elements and optional focusing lenses.

FIG. 1 depicts an exemplary embodiment of an ellipsometer with two retarding elements and optional focusing lenses. The ellipsometer sequentially comprises a light source (LS), an optional chopper (Cn), a Polarizer (P) (i.e. a polarizing optical element), a compensator on the input side (C) (i.e. a retarding optical element), an optional input-side lens assembly (L), a measured sample (MS) mounted on a stage (STG), an equivalent lens assembly on the detector side (L), a detector-side compensator (C') (i.e. a retarding optical element), an Analyzer (A) (polarizing optical element), and a single-point spectroscopic detector (D).

Figure 2A:
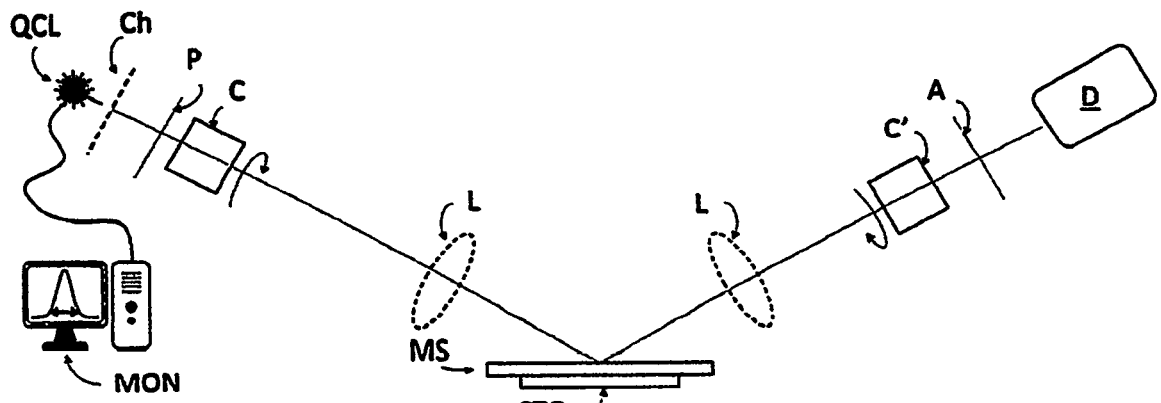
FIG. 2A shows a dual-rotating element (both compensators) embodiment of an ellipsometer with a QCL light source
Figure 2B:
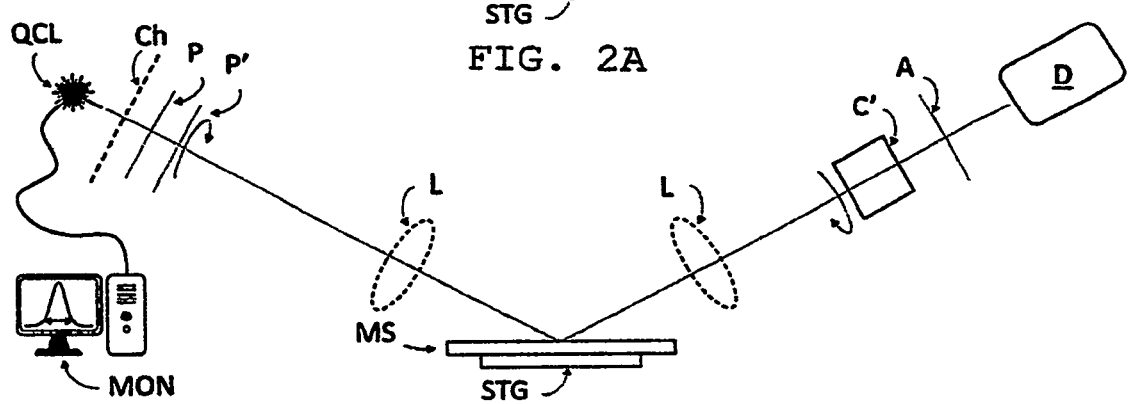
FIG. 2B shows a dual-rotating element (polarizer and compensator) embodiment of an ellipsometer with a QCL light source.
Figure 2C:
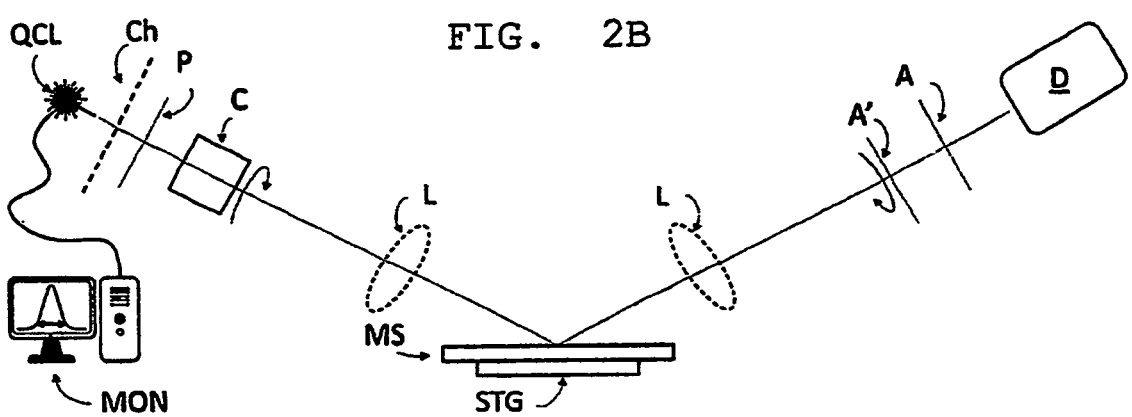
FIG. 2C shows a dual-rotating element (polarizer and analyzer) embodiment of an ellipsometer with a QCL light source
Figure 2D:
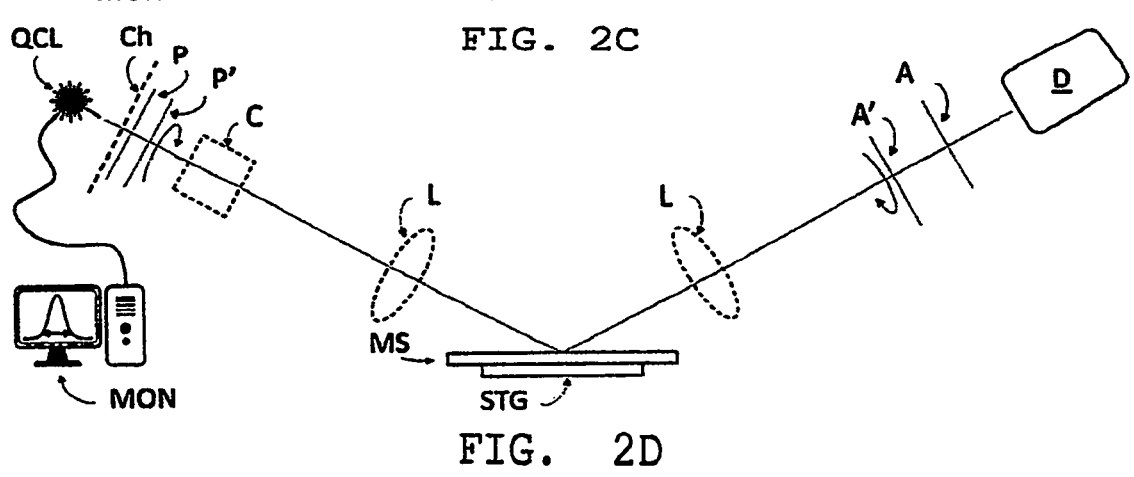
FIG. 2D shows a dual-rotating element (compensator and analyzer) embodiment of an ellipsometer with a QCL light source.
Figure 3A:
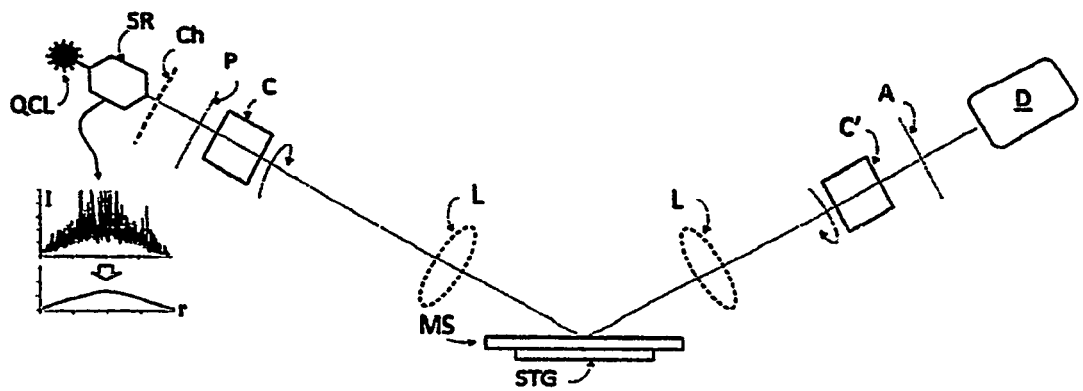
FIG. 3A shows a dual-rotating element (both compensators) embodiment of an ellipsometer with a QCL light source, including a speckle reducer (SR).
Figure 3B:
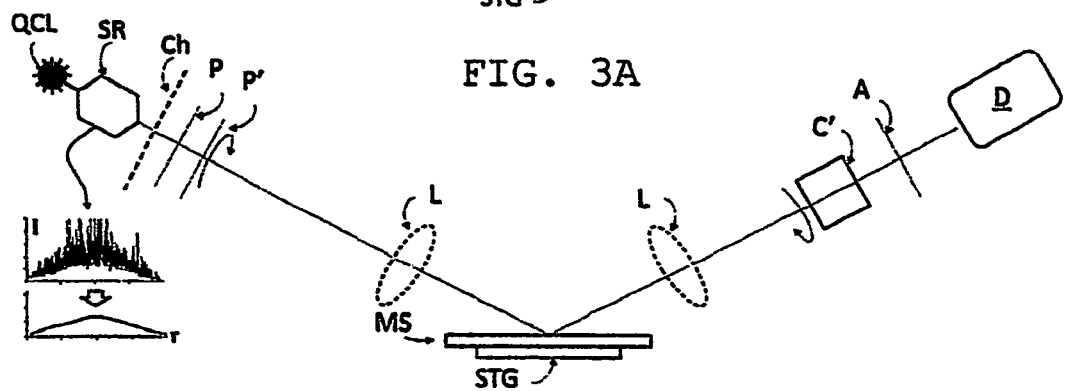
FIG. 3B shows a dual-rotating element (polarizer and compensator) embodiment or an ellipsometer with a QCL light source, including a speckle reducer (SR).
Figure 3C:
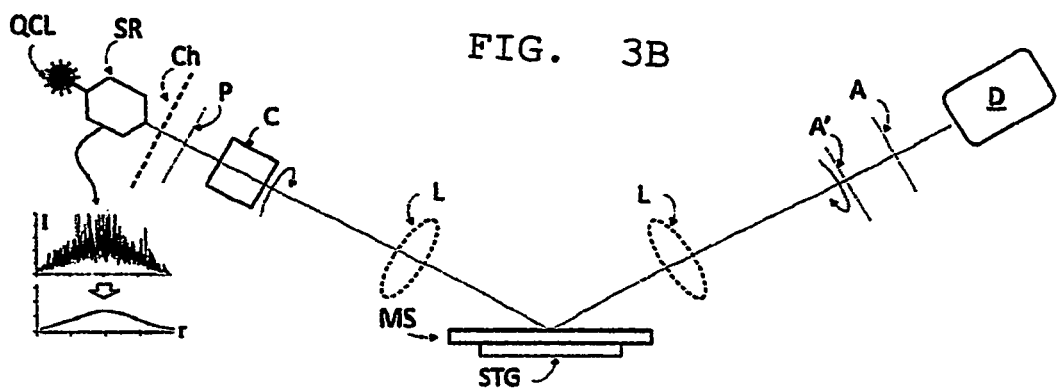
FIG. 3C shows a dual-rotating element (polarizer and analyzer) embodiment of an ellipsometer with a QCL light source, including a speckle reducer (SR).
Figure 3D:
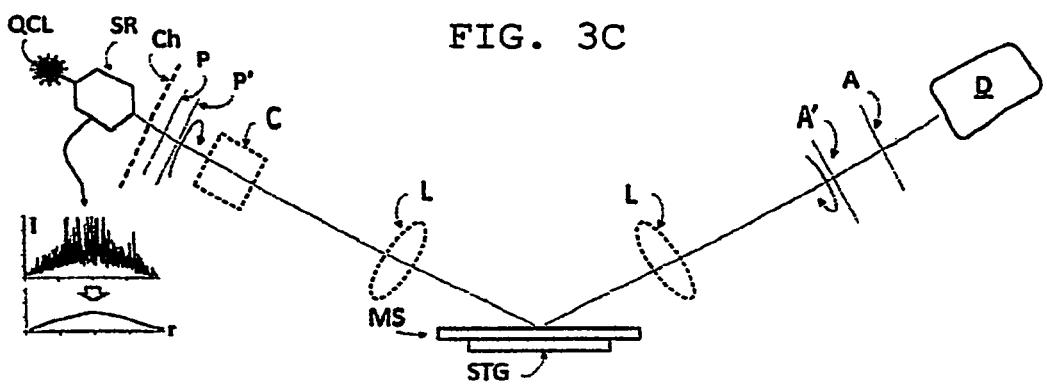
FIG. 3D shows a dual-rotating element (compensator and analyzer) embodiment of an ellipsometer with a QCL light source, including a speckle reducer (SR).
Figure 4A:
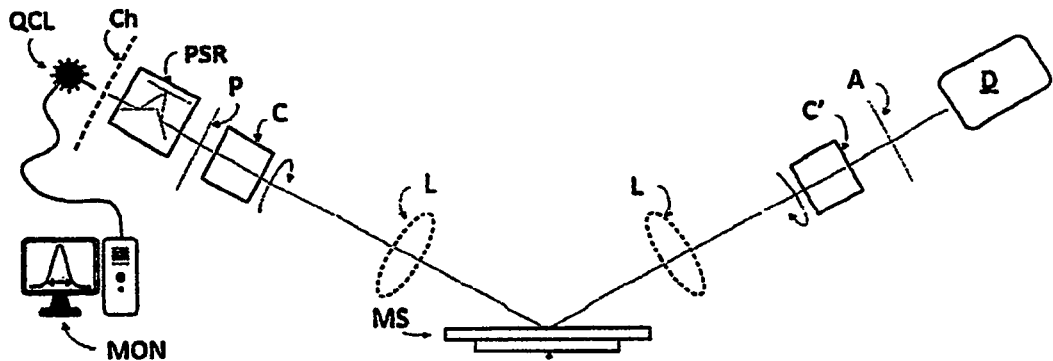
FIG. 4A shows a dual-rotating element (both compensators) embodiment of an ellipsometer with a QCL light source, including a polarization state rotating element (PSR).
Figure 4B:
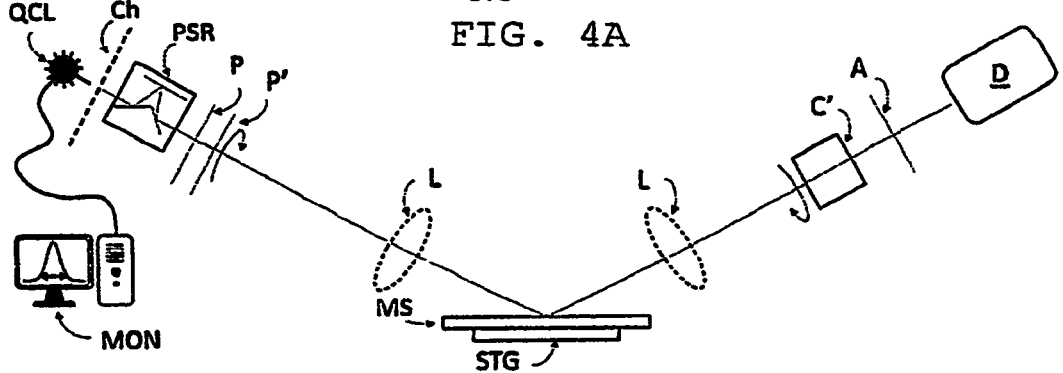
FIG. 4B shows a dual-rotating element (polarizer and compensator) embodiment of an ellipsometer with a QCL light source, including a polarization state rotating element (PSR)
Figure 4C:
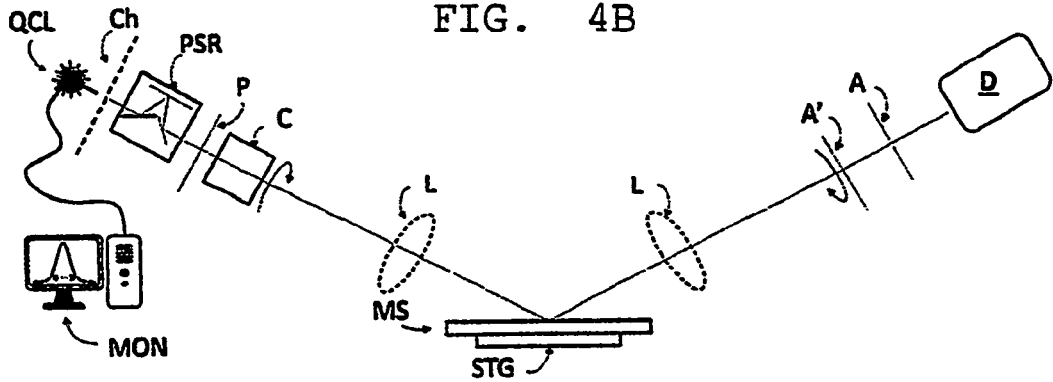
FIG. 4C shows a dual-rotating element (polarizer and analyzer) embodiment of an ellipsometer with a QCL light source, including a polarization state rotating element (PSR).
Figure 4D:
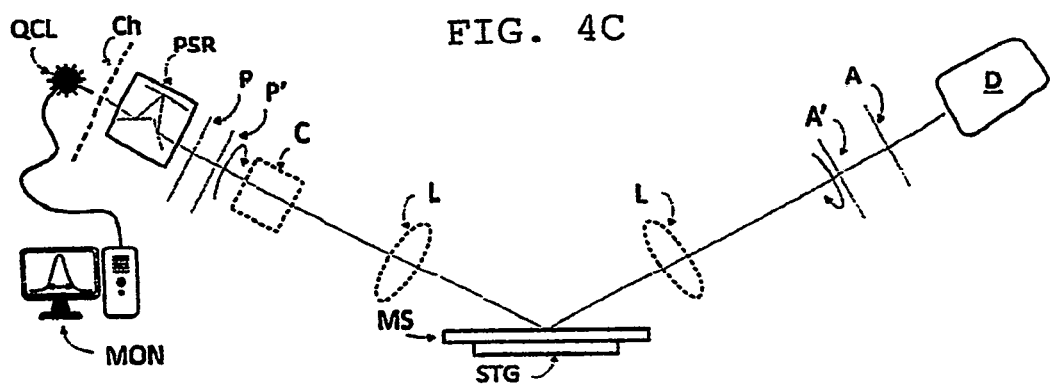
FIG. 4D shows a dual-rotating element (compensator and analyzer) embodiment of an ellipsometer with a QCL light source, including a polarization state rotating element (PSR).

FIGS. 2A-2D show dual-rotating element ellipsometer designs with a QCL light source with wavelength dithering and different elements rotating. Also shown is a monitor (MON) which displays a representative plot of the effective QCL output profile after applying wavelength dithering. FIG. 2A depicts a modification in which the Polarizer (P) and Analyzer (A) are fixed and the input-side and detector-side compensators (C,C') are continuously rotated in sync but at different frequencies to create a modulated raw signal on the single point detector. In FIG. 2B, the input-side compensator is replaced by another Polarizer (P') which is continuously rotating in sync but at different frequency than the detector-side compensator (C'). In FIG. 2C, the detector-side compensator is replaced by a second Analyzer (A') which is continuously rotating in sync with the input-side compensator but at different frequency. In FIG. 2D, the detector-side compensator is replaced by a second Analyzer (A') which is continuously rotating in sync with the input-side Polarizer but at different frequency. A fixed Compensator (C) can optionally be added to the beam path to add a predefined, fixed amount or retardation to the beam resulting in elliptically polarized light interacting with the sample, for example to improve the accuracy when measuring transparent samples.

FIGS. 3A-3D depict equivalent setups as in FIGS. 2A-2D, but instead of wavelengths dithering, the coherence length is reduced using a speckle reducer (SR). Also shown is a plotted indication of the effect of the speckle reducer on a spatially resolved detector signal, (i.e. a speckle intensity (I) pattern without speckle reducer and smooth intensity pattern with speckle reducer added to the beam).

FIGS. 4A-4D depict equivalent setups as in FIGS. 2A-2D, but an additional polarization state rotating element (PSR) is inserted in the beam path between the QCL and the first polarizing element (P). As in FIGS. 2A-2D, a monitor (MON) is shown which provides insight to the QCL output when applying the wavelength dithering.

Figure 5A:
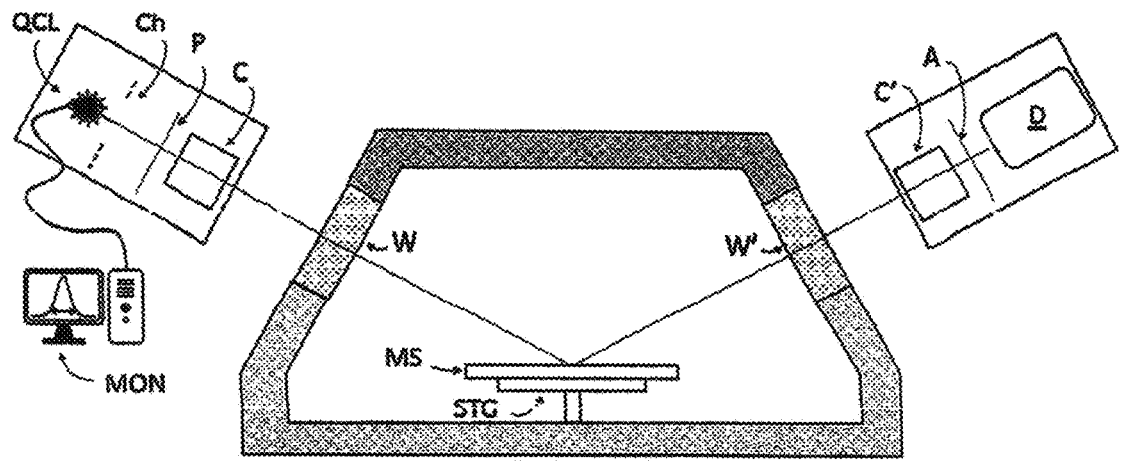
FIG. 5A shows a dual-rotating element ellipsometer attached to the outside of a chamber with sample mounted inside the chamber.
Figure 5B:
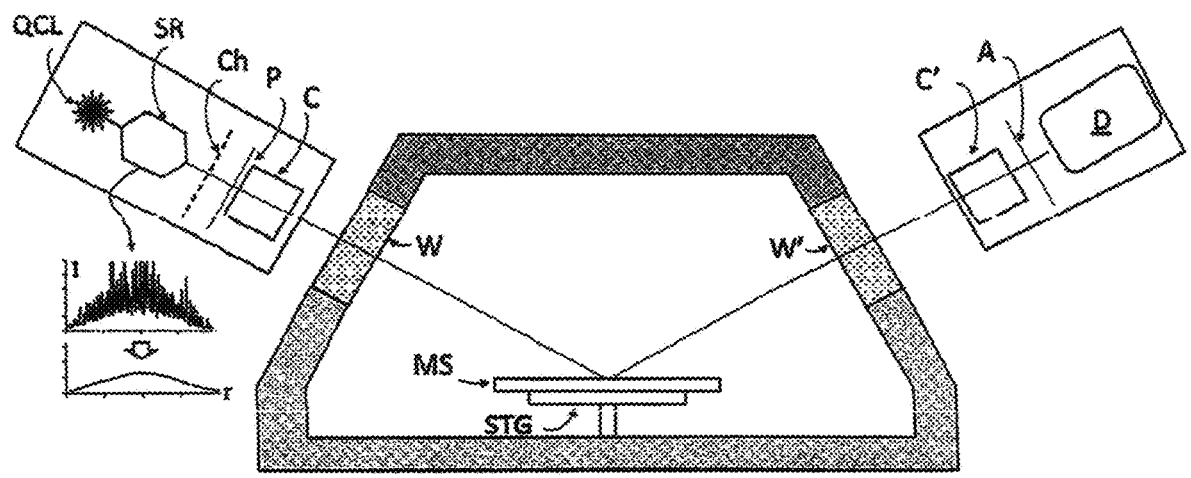
FIG. 5B shows a dual-rotating element ellipsometer including a speckle reducer (SR), attached to the outside of a chamber with sample mounted inside the chamber.

FIGS. 5A and 5B depict a dual-rotating element ellipsometer with QCL light source mounted on a chamber so that the beam of electromagnetic radiation emitted from the source assembly can pass through an IR transparent window (W), interact with a sample mounted on a stage within the chamber, pass through another IR transparent window (W'), and be detected by the detector assembly. In FIG. 5A, the system uses wavelength dithering while in FIG. 5B, a speckle reducer (SR) reduces the coherence length of the QCL. FIG. 5b shows the effect of the speckle reducer (SR) on a spatially resolved detector signal.

Figure 6:
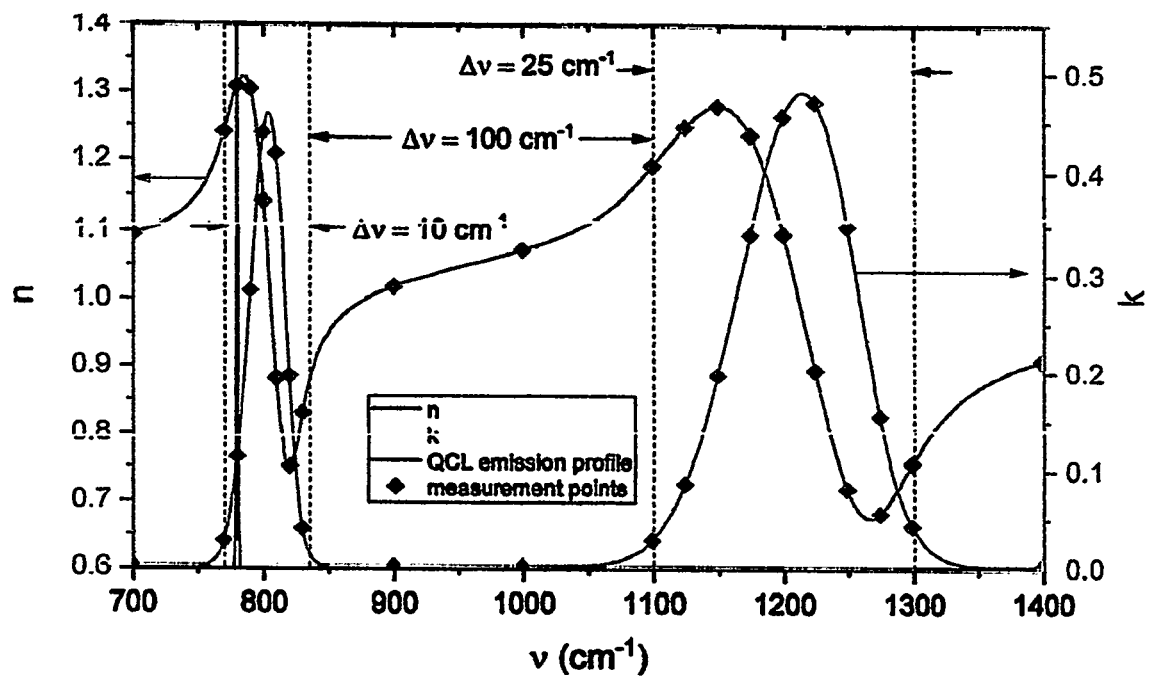
FIG. 6 shows a measurement profile where the resolution of the QCL frequency steps is adjusted spectrally to resolve an absorption feature of interest.

FIG. 6 shows a customized measurement profile where the resolution of the QCL frequency steps is adjusted spectrally to resolve an absorption feature of interest. Note, the more narrow absorption feature at lower frequencies is measured with a finer frequency resolution than the wider feature at high frequencies. Between the absorption features, a single or a few data points are sufficient to determine, for example, the thickness of a thin film in the spectral range where the film is transparent and light can travel through the film and be reflected at interfaces with subjacent layers or the substrate. The spectral profile of a typical QCL is overlayed to show that even fine resolution of less than 10 $cm^{-1}$ steps are feasible with adequate bandwidth for each frequency point.

Figure 7:
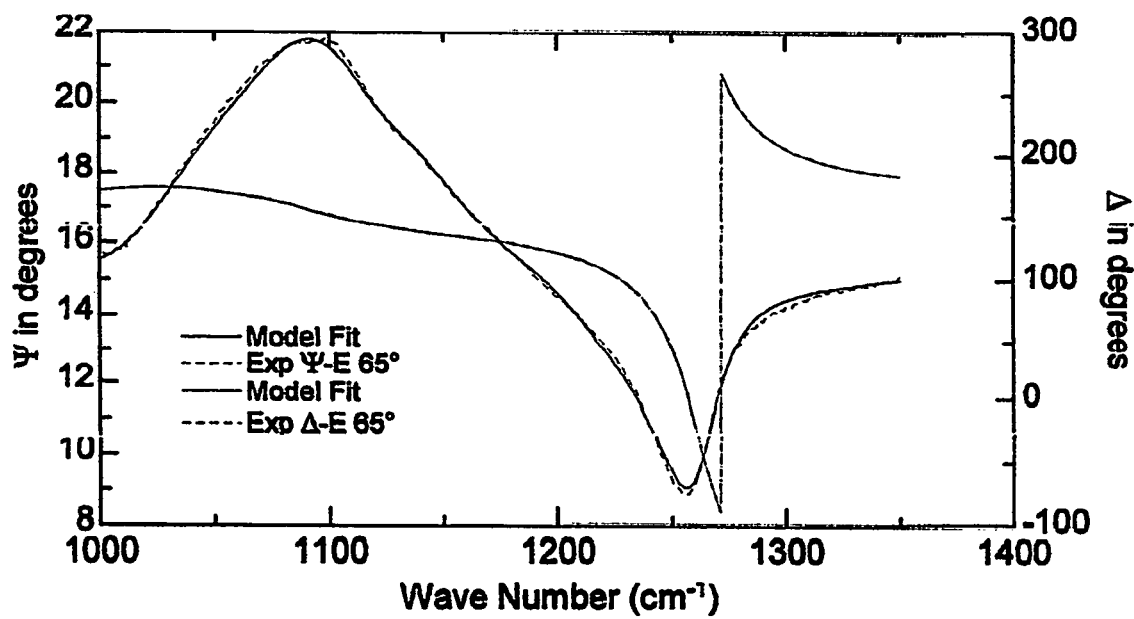
FIG. 7 shows experimental and best-match model generated data for a 120 nm thermal oxide film on silicon substrate.

FIG. 7 shows experimental and best-match model generated data for a 120 nm thermal oxide film on silicon substrate measured on a dual-rotating element ellipsometer prototype with tunable QCL source. Excellent match between model and experiment is achieved by using standard material properties from a library and only matching the thickness of the thin film which demonstrates the accuracy of the instrument versus many frequencies.

Figure 8:
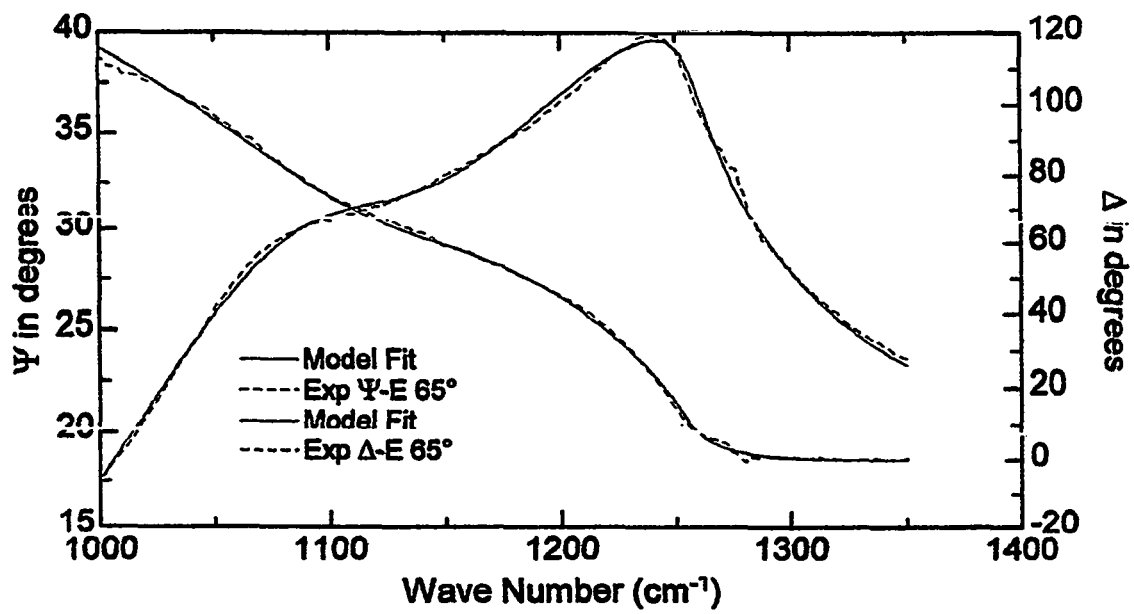
FIG. 8 depicts experimental and best-match model generated data for a glass slide measured on a dual-rotating element ellipsometer.

FIG. 8 depicts experimental and best-match model generated data for a glass slide measured on a dual-rotating element ellipsometer prototype with tunable QCL source demonstrating the accuracy of the ellipsometer for measurements on transparent substrates.

Figure 9:
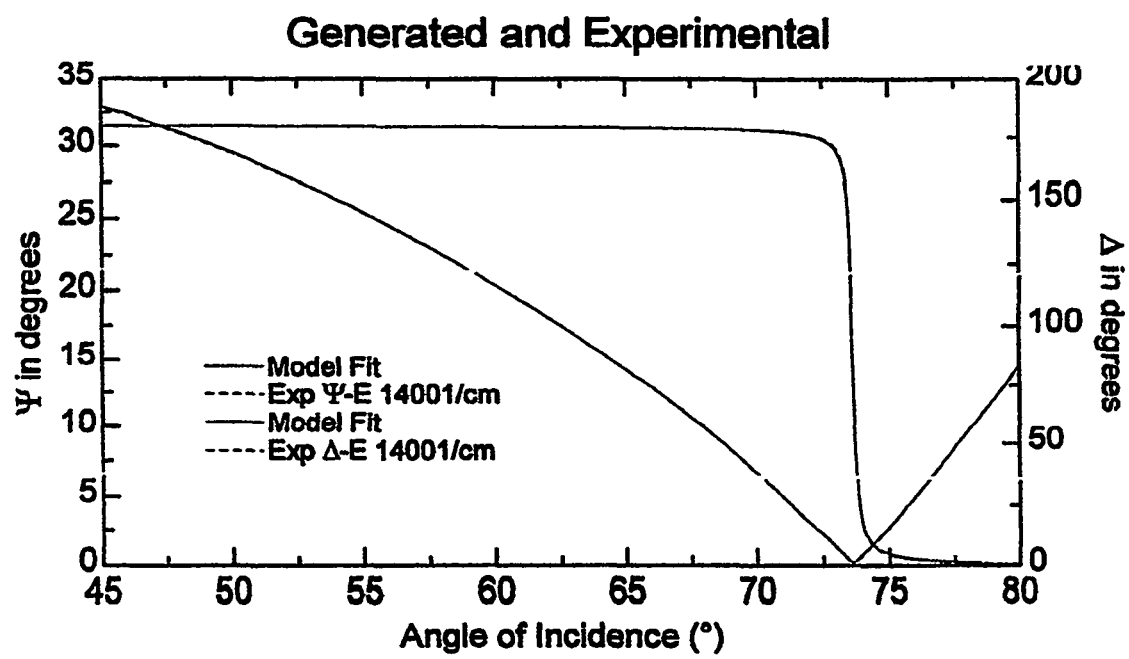
FIG. 9 shows experimental and best-match model generated data for a silicon wafer with native oxide at a fixed frequency of 1400 cm-1 versus angle of incidence demonstrating the accuracy of the prototype vs. angle of incidence.

FIG. 9 shows experimental and best-match model generated data for a silicon wafer with native oxide at a fixed frequency of 1400 cm-1 versus angle of incidence demonstrating the accuracy of the prototype vs. angle of incidence.

While the Specification is written sufficiently broad to include other sources of electromagnetic radiation, it is to be understood that the present invention is found in the use of a tunable quantum cascade laser source in combination with the presence or Speckle Reducing element(s) and/or practices.

It is also noted that that the word "Dither" can be replaced with the words "Wavelength Scrambling", "Wavelength Shifting", or similar variations.

Further, it should be appreciated that FIGS. 1-5B indicate that elements of the system:
a') said quantum cascade laser source of high-brilliance, tunable electromagnetic radiation with emission wavelengths in the mid-infrared spectral range, said quantum cascade laser source comprising means for dithering the electromagnetic radiation output;
b') said beam polarizing optical element;
c') said first rotatable optical retarder or polarizer element;
d') said stage for supporting a sample;
e') a second rotatable optical retarder or polarizer element;
f') said beam analyzing polarizer optical element; and
g') said single-point detector for infrared radiation which is not capable of resolving individual pulses of quantum cascade laser electromagnetic radiation;
are physically sequentially separated from one another. Present invention methodology discloses that separation distances between elements can be significant as regards data obtained when wavelengths in the IR range are involved. The present invention provides for adjustment of separation distances during data collection, including the collection of different data sets corresponding to different element separations, and practice of simultaneous regression of a mathematical model thereonto.

Having hereby disclosed the subject matter of the present invention, it should be obvious that many modifications, substitutions, and variations of the present invention are possible in view of the teachings. It is therefore to be understood that the invention may be practiced other than as specifically described and should be limited in breadth and scope only by the Claims.

We claim:

1. A method of investigating a sample with electromagnetic radiation in the mid-infrared spectral range, which reduces the effects of speckle and standing waves, comprising the steps of:
  a) providing an ellipsometer or polarimeter system comprising:
    a') a quantum cascade laser source of high-brilliance, tunable electromagnetic radiation with emission wavelengths in the mid-infrared spectral range, said quantum cascade laser source comprising means for dithering the electromagnetic radiation output;
    b') a beam polarizing optical element;
    c') a first rotatable optical retarder or polarizer element;
    d') a stage for supporting a sample;

e') a second rotatable optical retarder or polarizer element;

f') a beam analyzing polarizer optical element;

g') a single-point detector for infrared radiation which is not capable of resolving individual pulses of quantum cascade laser electromagnetic radiation;

said method being characterized in that:

during use said quantum cascade laser source of electromagnetic radiation operates in a continuous or quasi-continuous wave, so that individual pulses are not detected; and during use the wavelength content of said continuous or quasi-continuous wave is dithered so that cyclically or randomly a sequential plurality of different wavelengths around a central wavelength is output; and during use said detector provides output data based on an average of a multiplicity of pulses in said continuous or quasi-continuous dithered electromagnetic radiation input thereto; and during use said rotatable optical retarder or polarizing elements continuously rotate at different frequencies of fixed ratio;

said method further comprising:

b) placing a sample on said stage for supporting a sample;

c) while causing said rotatable optical retarder or polarizing elements continuously rotate at different frequencies of fixed ratio, causing said quantum cascade laser source to provide a dithered continuous or quasi-continuous beam of electromagnetic radiation directed so that it passes through said:

beam polarizing optical element; and first rotatable optical retarder or polarizer element;

interacts with said sample on said stage for supporting a sample;

then passes through said:

second rotatable optical retarder or polarizer element; and beam analyzing polarizer optical element; and enters said single-point detector for infrared radiation;

d) causing said single-point detector for infrared radiation to provide sample characterizing output data based upon said received dithered continuous or quasi-continuous beam of electromagnetic radiation; and e) analyzing the data output by said single-point detector to provide sample characterizing information.

2. A method as in claim 1, in which the step of providing ellipsometer or polarimeter system involves providing a system characterized by at least one selection from the group consisting of:

a") said detector is characterized by a selection from the group consisting of:
DTGS;
MCT;
LiTaO3;
PbS;
PbSe;
InSb;
a QWIP detector; and
a Si bolometer;

b") said beam polarizing and analyzing optical elements are free-standing or substrate-bonded wire grid polarizers;

c") said first and second retarding or polarizer optical elements are dual Fresnel rhomb retarders, a single-triangle retarder, a dual-triangular shaped retarder, or a parallelogram-shaped retarder;

d") said beam polarizing and analyzing optical elements are movable along the path of the beam of electromagnetic radiation;

e") said first rotatable retarder or polarizer optical element is a rotatable polarizer optical element;

f") said second rotatable retarder or polarizer optical element is a rotatable polarizing optical element;

g") said first rotatable retarder or polarizer optical element is a rotatable retarder optical element;

h") said second rotatable optical retarder or polarizer element is a rotatable retarder optical element;

i") a polarization state rotator is placed between the source and the beam polarizing element;

j") an additional movable polarizer is provided in front of the beam polarizing element; and k") where lenses are added between the rotatable optical retarder or polarizing elements and the sample to reduce the size of the measurement spot on the sample surface.

3. A method as in claim 1 in which step e) involves performing a mathematical regression based on data obtained in step d) onto a mathematical model of the sample.

4. A method as in claim 1, which further comprises changing the relative distance, along the path of the beam of electromagnetic radiation, between at least two system elements selected from the group consisting of:

a') said quantum cascade laser source of high-brilliance, tunable electromagnetic radiation with emission wavelengths in the mid-infrared spectral range, said quantum cascade laser source comprising means for dithering the electromagnetic radiation output;

b') said beam polarizing optical element;

c') said first rotatable optical retarder or polarizer element;

d') said stage for supporting a sample;

e') a second rotatable optical retarder or polarizer element;

f') said beam analyzing polarizer optical element; and g') said single-point detector for infrared radiation which is not capable of resolving individual pulses of quantum cascade laser electromagnetic radiation;

and, in step d) obtaining data sets for each resulting configuration, then in step e) performing a simultaneous mathematical regression of all said data sets onto a mathematical model of said sample.

5. A method as in claim 4, in which the simultaneous mathematical regression is applied to data sets obtained when the changed distance involved is between:

f') said beam analyzing polarizer optical element; and g') said single-point detector for infrared radiation which is not capable of resolving individual wavelengths of quantum cascade laser electromagnetic radiation.

6. A method as in claim 1, which further comprises changing the relative distance, along the path of the beam of electromagnetic radiation, between at least two system elements selected from the group consisting of:

a') said quantum cascade laser source of high-brilliance, tunable electromagnetic radiation with emission wavelengths in the mid-infrared spectral range, said quantum cascade laser source comprising means for dithering the electromagnetic radiation output;

b') said beam polarizing optical element;

c') said first rotatable optical retarder or polarizer element;

d') said stage for supporting a sample;

e') a second rotatable optical retarder or polarizer element;

f') said beam analyzing polarizer optical element; and g') said single-point detector for infrared radiation which is not capable of resolving individual pulses of quantum cascade laser electromagnetic radiation;

and in step d) changing at least one distance much fast than the averaging time of the detector for a single raw data point, thus averaging out the standing wave.

7. A method as in claim 6, in which the changed distance involved is between:
f') said beam analyzing polarizer optical element; and
g') said single-point detector for infrared radiation which is not capable of resolving individual wavelengths of quantum cascade laser electromagnetic radiation.

8. A method as in claim 6, in which the step of providing an ellipsometer system further comprises at least one selection from the group consisting of:
providing a chopper between source and beam polarizing optical element and electronic means to synchronize the detector signal to the chopper frequency lock-in detection;
providing a stationary retarder after the first rotatable element to present elliptically polarized electromagnetic radiation thereafter;
providing a speckle reducer between said quantum cascade laser source of infrared electromagnetic radiation and said single point detector thereof;
providing a fixed compensator between said quantum cascade laser source of infrared electromagnetic radiation and said single point detector thereof;
providing focusing and re-collimation elements before and after said stage for and supporting a sample respectively;
providing focusing and re-collimation lenses which are mounted to allow movement along the path of said beam of electromagnetic radiation before and after said stage for and supporting a sample respectively; and
selecting said first and second rotatable optical retarder or polarizer elements from the group consisting of:
the first is a retarder optical element and the second is a polarizer optical element;
the second is a retarder optical element and the first is a polarizer optical element;
both first and second optical elements are polarizer elements;
both first and second optical elements are retarder elements.

9. A system as in claim 6, in which the ellipsometer or polarimeter involves said first and second rotatable optical retarder or polarizer elements are both polarizer elements.

10. A method as in claim 1, in which the step of providing an ellipsometer system further comprises at least one selection from the group consisting of:
providing a chopper between source and beam polarizing optical element and electronic means to synchronize the detector signal to the chopper frequency lock-in detection;
providing a stationary retarder after the first rotatable element to present elliptically polarized electromagnetic radiation thereafter;
providing a speckle reducer between said quantum cascade laser source of infrared electromagnetic radiation and said single point detector thereof;
providing a fixed compensator between said quantum cascade laser source of infrared electromagnetic radiation and said single point detector thereof;
providing focusing and re-collimation elements before and after said stage for and supporting a sample respectively;
providing focusing and re-collimation lenses which are mounted to allow movement along the path of said beam of electromagnetic radiation before and after said stage for and supporting a sample respectively; and
selecting said first and second rotatable optical retarder or polarizer elements from the group consisting of:
the first is a retarder optical element and the second is a polarizer optical element;
the second is a retarder optical element and the first is a polarizer optical element;
both first and second optical elements are polarizer elements;
both first and second optical elements are retarder elements.

11. A method as in claim 1, in which the step of providing an ellipsometer or polarimeter involves said first and second rotatable optical retarder or polarizer elements are both polarizer elements.

12. An ellipsometer or polarimeter system comprising:
a') a quantum cascade laser source of high-brilliance, tunable electromagnetic radiation with emission wavelengths in the mid-infrared spectral range, said quantum cascade laser source comprising means for dithering the electromagnetic radiation output;
b') a beam polarizing optical element;
c') a first rotatable optical retarder or polarizer element;
d') a stage for supporting a sample;
e') a second rotatable optical retarder or polarizer element;
f') a beam analyzing polarizer optical element;
g') a single-point detector for infrared radiation which is not capable of resolving individual pulses of quantum cascade laser electromagnetic radiation;
said ellipsometer or polarimeter system being characterized in that:
during use said quantum cascade laser source of electromagnetic radiation operates in a continuous or quasi-continuous wave mode and does not resolve individual laser pulses; and
during use the wavelength content of said continuous or quasi-continuous wave is dithered so that cyclically or randomly a sequential plurality of different wavelengths around a central wavelength is output; and
during use said detector provides output data based on an average of a multiplicity of pulses in said continuous or quasi-continuous dithered electromagnetic radiation input thereto; and
during use said rotatable optical retarder or polarizing elements continuously rotate at different frequencies of fixed ratio;
such that in use a sample is placed on said stage for supporting a sample, and while causing said rotatable optical retarder or polarizing elements continuously rotate at different frequencies of fixed ratio, said quantum cascade laser source is caused to provide a dithered continuous or quasi-continuous beam of electromagnetic radiation directed so that it passes through said:
beam polarizing optical element; and
first rotatable optical retarder or polarizer element;
interacts with said sample on said stage for supporting a sample;
then passes through said:
second rotatable optical retarder or polarizer element; and
beam analyzing polarizer optical element; and
enters said single-point detector for infrared radiation;
such that said single-point detector of infrared radiation provides sample characterizing output data based upon said received dithered continuous or quasi-continuous beam of electromagnetic radiation, and said data output by said single-point detector provides sample characterizing information.

13. An ellipsometer or polarimeter system as in claim 12, which involves providing a system characterized by at least one selection from the group consisting of:
   a") said detector is characterized by a selection from the group consisting or:
   DTGS;
   MCT;
   LiTaO3;
   PbS;
   PbSe;
   InSb;
   a QWIP detector; and
   a Si bolometer;
   b") said beam polarizing and analyzing optical elements are free-standing or substrate-bonded wire grid polarizers;
   c") said first and second retarding or polarizer optical elements are dual Fresnel rhomb retarders, a single-triangle retarder, a dual-triangular shaped retarder, or a parallelogram-shaped retarder;
   d") said beam polarizing and analyzing optical elements are movable along the path of the beam of electromagnetic radiation;
   e") said first rotatable retarder or polarizer optical element is a rotatable polarizer optical element;
   f") said second rotatable retarder or polarizer optical element is a rotatable polarizing optical element;
   g") said first rotatable retarder or polarizer optical element is a rotatable retarder optical element;
   h") said second rotatable optical retarder or polarizer element is a rotatable retarder optical element;
   i") a polarization state rotator is placed between the source and the beam polarizing element;
   j") an additional movable polarizer is provided in front of the beam polarizing element; and
   k") where lenses are added between the rotatable optical retarder or polarizing elements and the sample to reduce the size of the measurement spot on the sample surface.

14. A method as in claim 12, in which the step of providing an ellipsometer system further comprises at least one selection from the group consisting of:
   providing a chopper between source and beam polarizing optical element and electronic means to synchronize the detector signal to the chopper frequency lock-in detection;
   providing a stationary retarder after the first rotatable element to present elliptically polarized electromagnetic radiation thereafter;
   providing a speckle reducer between said quantum cascade laser source of infrared electromagnetic radiation and said single point detector thereof;
   providing a fixed compensator between said quantum cascade laser source of infrared electromagnetic radiation and said single point detector thereof;
   providing focusing and re-collimation elements before and after said stage for and supporting a sample respectively;
   providing focusing and re-collimation lenses which are mounted to allow movement along the path of said beam of electromagnetic radiation before and after said stage for and supporting a sample respectively; and
   selecting said first and second rotatable optical retarder or polarizer elements from the group consisting of:
   the first is a retarder optical element and the second is a polarizer optical element;
   the second is a retarder optical element and the first is a polarizer optical element;
   both first and second optical elements are polarizer elements;
   both first and second optical elements are retarder elements.

15. A system as in claim 12, in which the ellipsometer or polarimeter involves said first and second rotatable optical retarder or polarizer elements are both polarizer elements.

16. An ellipsometer or polarimeter system sequentially comprising:
   a) a high-brilliance, tunable quantum cascade laser source of electromagnetic radiation with emission wavelengths in the mid-infrared spectral range;
   b) a beam polarizing optical element;
   c) a first rotatable optical retarder or polarizer element;
   d) a stage for supporting a sample;
   e) a second rotatable optical retarder or polarizer element;
   f) a beam analyzing polarizing optical element;
   g) a single-point detector of infrared radiation;
   said ellipsometer being characterized by:
   said rotatable optical retarder or polarizer elements continuously rotate at different frequencies of fixed ratio;
   said tunable quantum cascade laser source of electromagnetic radiation operates in a continuous or quasi-continuous wave mode and does not resolve individual laser pulses, but rather averages a multiplicity thereof when obtaining data; and
   said ellipsometer system further comprises a movable grating which is periodically or randomly changed in position to add and subtract small angle shifts from a nominal wavelength set position, thereby providing slightly different wavelengths at different times which reduces coherence length and thereby reduce speckle and standing waves.

17. An ellipsometer or polarimeter system as in claim 16, is further characterized by at least one selection from the group consisting of:
   a") said detector is characterized by a selection from the group consisting of:
   DTGS;
   MCT;
   LiTaO3;
   PbS;
   PbSe;
   InSb;
   a QWIP detector; and
   a Si bolometer;
   b") said beam polarizing and analyzing optical elements are free-standing or substrate-bonded wire grid polarizers;
   c") said first and second retarding or polarizer optical elements are dual Fresnel rhomb retarders, a single-triangle retarder, a dual-triangular shaped retarder, or a parallelogram-shaped retarder;
   d") said beam polarizing and analyzing optical elements are movable along the path or the beam or electromagnetic radiation;
   e") said first rotatable retarder or polarizer optical element is a rotatable polarizer optical element;
   f") said second rotatable retarder or polarizer optical element is a rotatable polarizing optical element;
   g") said first rotatable retarder or polarizer optical element is a rotatable retarder optical element;

h") said second rotatable optical retarder or polarizer element is a rotatable retarder optical element;

i") a polarization state rotator is placed between the source and the beam polarizing element;

j") an additional movable polarizer is provided in front of the beam polarizing element; and k") where lenses are added between the rotatable optical retarder or polarizing elements and the sample to reduce the size of the measurement spot on the sample surface.

18. A method as in claim 16, in which the step of providing an ellipsometer system further comprises at least one selection from the group consisting of:

providing a chopper between source and beam polarizing optical element and electronic means to synchronize the detector signal to the chopper frequency lock-in detection;

providing a stationary retarder after the first rotatable element to present elliptically polarized electromagnetic radiation thereafter;

providing a speckle reducer between said quantum cascade laser source of infrared electromagnetic radiation and said single point detector thereof;

providing a fixed compensator between said quantum cascade laser source of infrared electromagnetic radiation and said single point detector thereof;

providing focusing and re-collimation elements before and after said stage for and supporting a sample respectively;

providing focusing and re-collimation lenses which are mounted to allow movement along the path of said beam of electromagnetic radiation before and after said stage for and supporting a sample respectively; and selecting said first and second rotatable optical retarder or polarizer elements from the group consisting of:
the first is a retarder optical element and the second is a polarizer optical element;
the second is a retarder optical element and the first is a polarizer optical element;
both first and second optical elements are polarizer elements;
both first and second optical elements are retarder elements.

19. A method of investigating a sample comprising the steps of:

a) providing an ellipsometer or polarimeter system comprising:

a') a high-brilliance, tunable quantum cascade laser source of electromagnetic radiation with emission wavelengths in the mid-infrared spectral range including dithering capability;

b') a beam polarizing optical element;

c') a first rotatable optical retarder or polarizer element;

d') a stage for supporting a sample;

e') a second rotatable optical retarder or polarizer element;

f') a beam analyzing polarizer optical element;

g') a single-point detector of infrared radiation;

said ellipsometer being characterized by:

said rotatable optical retarder or polarizing elements continuously rotate at different frequencies of fixed ratio; and said quantum cascade laser source of electromagnetic radiation operates in a continuous or quasi-continuous wave mode and does not resolve individual laser pulses, but rather averages a multiplicity thereof when obtaining data;

b) applying said ellipsometer system to investigate a sample system with characteristic, sharp, spectral features in narrow ranges of the IR spectral range by customizing the measurement resolution spectrally to be able to fully resolve the features while limiting the number of data points in "flat" spectral ranges.

20. A method as in claim 19, in which the step of providing an ellipsometer or polarimeter is further characterized by said ellipsometer or polarimeter comprising at least one selection from the group consisting of:

a") said detector is characterized by a selection from the group consisting of:
DTGS;
MCT;
LiTaO3;
PbS;
PbSe;
InSb;
a QWIP detector; and
a Si bolometer;

b") said beam polarizing and analyzing optical elements are free-standing or substrate-bonded wire grid polarizers;

c") said first and second retarding or polarizer optical elements are dual Fresnel rhomb retarders, a single-triangle retarder, a dual-triangular shaped retarder, or a parallelogram-shaped retarder;

d") said beam polarizing and analyzing optical elements are movable along the path of the beam of electromagnetic radiation;

e") said first rotatable retarder or polarizer optical element is a rotatable polarizer optical element;

f") said second rotatable retarder or polarizer optical element is a rotatable polarizing optical element;

g") said first rotatable retarder or polarizer optical element is a rotatable retarder optical element;

h") said second rotatable optical retarder or polarizer element is a rotatable retarder optical element;

i") a polarization state rotator is placed between the source and the beam polarizing element;

j") an additional movable polarizer is provided in front of the beam polarizing element; and k") where lenses are added between the rotatable optical retarder or polarizing elements and the sample to reduce the size of the measurement spot on the sample surface.

21. A method as in claim 20, in which the step of providing an ellipsometer system further comprises at least one selection from the group consisting of:

providing a chopper between source and beam polarizing optical element and electronic means to synchronize the detector signal to the chopper frequency lock-in detection;

providing a stationary retarder after the first rotatable element to present elliptically polarized electromagnetic radiation thereafter;

providing a speckle reducer between said quantum cascade laser source of infrared electromagnetic radiation and said single point detector thereof;

providing a fixed compensator between said quantum cascade laser source of infrared electromagnetic radiation and said single point detector thereof;

providing focusing and re-collimation elements before and after said stage for and supporting a sample respectively;

providing focusing and re-collimation lenses which are mounted to allow movement along the path of said beam of electromagnetic radiation before and after said stage for and supporting a sample respectively; and selecting said first and second rotatable optical retarder or polarizer elements from the group consisting of:
- the first is a retarder optical element and the second is a polarizer optical element;
- the second is a retarder optical element and the first is a polarizer optical element;
- both first and second optical elements are polarizer elements;
- both first and second optical elements are retarder elements.

22. A method as in claim 19, in which the step of providing an ellipsometer system further comprises at least one selection from the group consisting of:
- providing a chopper between source and beam polarizing optical element and electronic means to synchronize the detector signal to the chopper frequency lock-in detection;
- providing a stationary retarder after the first rotatable element to present elliptically polarized electromagnetic radiation thereafter;
- providing a speckle reducer between said quantum cascade laser source of infrared electromagnetic radiation and said single point detector thereof;
- providing a fixed compensator between said quantum cascade laser source of infrared electromagnetic radiation and said single point detector thereof;
- providing focusing and re-collimation elements before and after said stage for and supporting a sample respectively;
- providing focusing and re-collimation lenses which are mounted to allow movement along the path of said beam of electromagnetic radiation before and after said stage for and supporting a sample respectively; and
- selecting said first and second rotatable optical retarder or polarizer elements from the group consisting of:
  - the first is a retarder optical element and the second is a polarizer optical element;
  - the second is a retarder optical element and the first is a polarizer optical element;
  - both first and second optical elements are polarizer elements;
  - both first and second optical elements are retarder elements.

23. A method of investigating a sample comprising the steps of:
a) providing an ellipsometer system comprising:
 a') a high-brilliance, tunable quantum cascade laser source of electromagnetic radiation with emission wavelengths in the mid-infrared spectral range;
 b') a beam polarizing optical element;
 c') a first rotatable optical retarder or polarizer element;
 d') a stage for supporting a sample which is present within a chamber comprising IR transparent windows;
 e') a second rotatable optical retarder or polarizer element;
 f') a beam analyzing polarizer optical element;
 g') a single-point detector for infrared radiation;
said ellipsometer being characterized by:
 said rotatable optical retarder or polarizing elements continuously rotate at different frequencies of fixed ratio; and
 said source of electromagnetic radiation operates in a continuous or quasi-continuous wave mode and does not resolve individual laser pulses, but rather averages a multiplicity thereof when obtaining data; and
 said ellipsometer system further comprises a movable grating which is periodically or randomly changed in position to add and subtract small angle shifts from a nominal wavelength set position, thereby providing slightly different wavelengths at different times which reduces coherence length and thereby reduce speckle and thus speckle;
 such that during use the wavelength content of said continuous or quasi-continuous wave is dithered so that cyclically or randomly a sequential plurality of different wavelengths around a central wavelength ("set wavelength") is output; and
 during use said detector provides output data based on an average of a multiplicity of pulses of slightly different wavelengths in said continuous or quasi-continuous dithered electromagnetic radiation input thereto;
b) placing a sample on said sample stage and causing a beam of electromagnetic radiation produced by said high-brilliance, tunable source of a beam of electromagnetic radiation with emission wavelengths in the mid-infrared spectral range to pass through said IR transparent windows and interact with the sample mounted on said stage for supporting a sample;
c) setting the wavelength output emitted from the source of electromagnetic radiation to one wavelength, or sequentially to a discrete, small, pre-defined subset of wavelengths suitable to characterize modification of said sample within said chamber and repeatedly cycling through said subset of wavelengths to monitor the change of sample properties versus time.

24. A method as in claim 23, in which the step of providing an ellipsometer or polarimeter is further characterized by said ellipsometer or polarimeter comprising at least one selection from the group consisting of:
a") said detector is characterized by a selection from the group consisting of:
- DTGS;
- MCT;
- LiTaO3;
- PbS;
- PbSe;
- InSb;
- a QWIP detector; and
- a Si bolometer;

b") said beam polarizing and analyzing optical elements are free-standing or substrate-bonded wire grid polarizers;

C") said first and second retarding or polarizer optical elements are dual Fresnel rhomb retarders, a single-triangle retarder, a dual-triangular shaped retarder, or a parallelogram-shaped retarder;

d") said beam polarizing and analyzing optical elements are movable along the path of the beam of electromagnetic radiation;

e") said first rotatable retarder or polarizer optical element is a rotatable polarizer optical element;

f") said second rotatable retarder or polarizer optical element is a rotatable polarizing optical element;

g") said first rotatable retarder or polarizer optical element is a rotatable retarder optical element;

h") said second rotatable optical retarder or polarizer element is a rotatable retarder optical element;

i") a polarization state rotator is placed between the source and the beam polarizing element;

j") an additional movable polarizer is provided in front of the beam polarizing element; and k") where lenses are added between the rotatable optical retarder or polarizing elements and the sample to reduce the size of the measurement spot on the sample surface.

25. A method as in claim 24, in which the step of providing an ellipsometer system further comprises at least one selection from the group consisting of:

providing a chopper between source and beam polarizing optical element and electronic means to synchronize the detector signal to the chopper frequency lock-in detection;

providing a stationary retarder after the first rotatable element to present elliptically polarized electromagnetic radiation thereafter;

providing a speckle reducer between said quantum cascade laser source of infrared electromagnetic radiation and said single point detector thereof;

providing a fixed compensator between said quantum cascade laser source of infrared electromagnetic radiation and said single point detector thereof;

providing focusing and re-collimation elements before and after said stage for and supporting a sample respectively;

providing focusing and re-collimation lenses which are mounted to allow movement along the path of said beam of electromagnetic radiation before and after said stage for and supporting a sample respectively; and selecting said first and second rotatable optical retarder or polarizer elements from the group consisting of:
  the first is a retarder optical element and the second is a polarizer optical element;
  the second is a retarder optical element and the first is a polarizer optical element;
  both first and second optical elements are polarizer elements;
  both first and second optical elements are retarder elements.

26. A method of investigating a sample comprising the steps of:

a) providing an ellipsometer system comprising:

a') a high-brilliance, tunable quantum cascade laser source of electromagnetic radiation with emission wavelengths in the mid-infrared spectral range;

b') a beam polarizing optical element;

c') a first rotatable optical retarder or polarizer element;

d') a movable stage for supporting a sample;

e') a second rotatable optical retarder or polarizer element;

f') a beam analyzing polarizer optical element;

g') a single-point detector of infrared radiation;

said ellipsometer being characterized by:

said rotatable optical retarder or polarizing elements continuously rotate at different frequencies of fixed ratio; and said quantum cascade laser source of electromagnetic radiation operates in a continuous or quasi-continuous wave mode and does not resolve individual laser pulses, but rather averages a multiplicity thereof when obtaining data; and said ellipsometer system further comprises a grating which is periodically or randomly changed in position to add and subtract small angle shifts from a nominal wavelength set position, thereby providing slightly different wavelengths at different times which reduces coherence length and thereby reduce speckle;

such that during use the wavelength content of said continuous or quasi-continuous wave is dithered so that cyclically or randomly a sequential plurality of different wavelengths around a central wavelength ("set wavelength") is output; and during use said detector provides output data based on an average of a multiplicity of pulses of slightly different wavelengths in said continuous or quasi-continuous dithered electromagnetic radiation input thereto;

b) placing a sample on said movable sample stage and causing a beam of electromagnetic radiation produced by said high-brilliance, tunable source of a beam of electromagnetic radiation with emission wavelengths in the mid-infrared spectral range to interact with the sample mounted on said stage for supporting a sample and enter said single point detector;

c) setting the wavelength output emitted from the source of electromagnetic radiation to one wavelength, or sequentially to a discrete, small, pre-defined subset of wavelengths suitable to characterize the variation of the sample properties, and while moving the sample under the measurement beam observing data provided by said single point detector output.

27. A method as in claim 26, in which the step of providing an ellipsometer system is further characterized by at least one selection from the group consisting of:

a") said detector is characterized by a selection from the group consisting of:
  DTGS;
  MCT;
  LiTaO3;
  PbS;
  PbSe;
  InSb;
  a QWIP detector; and
  a Si bolometer;

b") said beam polarizing and analyzing optical elements are free-standing or substrate-bonded wire grid polarizers;

c") said first and second retarding or polarizer optical elements are dual Fresnel rhomb retarders, a single-triangle retarder, a dual-triangular shaped retarder, or a parallelogram-shaped retarder;

d") said beam polarizing and analyzing optical elements are movable along the path of the beam of electromagnetic radiation;

e") said first rotatable retarder or polarizer optical element is a rotatable polarizer optical element;

f") said second rotatable retarder or polarizer optical element is a rotatable polarizing optical element;

g") said first rotatable retarder or polarizer optical element is a rotatable retarder optical element;

h") said second rotatable optical retarder or polarizer element is a rotatable retarder optical element;

i") a polarization state rotator is placed between the source and the beam polarizing element;

j") an additional movable polarizer is provided in front of the beam polarizing element; and k") where lenses are added between the rotatable optical retarder or polarizing elements and the sample to reduce the size of the measurement spot on the sample surface.

* * * * *